United States Patent [19]
Nack et al.

[11] Patent Number: 5,317,689
[45] Date of Patent: May 31, 1994

[54] DIGITAL VISUAL AND SENSOR SIMULATION SYSTEM FOR GENERATING REALISTIC SCENES

[75] Inventors: Myron L. Nack, Los Alamitos; Thomas O. Ellis, Playa Del Rey; Norton L. Moise, Pacific Palisades; Andrew Rosman, Los Alamitos; Robert J. McMillen, Long Beach; Chao Yang, Cerritos; Gary N. Landis, Hermosa Beach, all of Calif.

[73] Assignee: Hughes Aircraft Company, Los Angeles, Calif.

[21] Appl. No.: 565,864

[22] Filed: Aug. 10, 1990

Related U.S. Application Data

[63] Continuation of Ser. No. 925,855, Sep. 11, 1986, abandoned.

[51] Int. Cl.⁵ .................. G06F 15/16; G06F 15/66
[52] U.S. Cl. ............................ 395/163; 395/164
[58] Field of Search ............ 364/521, 518, 522, 162, 364/163, 164, 165; 340/747, 750, 798, 799; 345/127, 131

[56] References Cited

U.S. PATENT DOCUMENTS

| | | | |
|---|---|---|---|
| 4,017,985 | 4/1977 | Heartz | 35/10.4 |
| 4,343,037 | 8/1982 | Bolton | 364/521 |

(List continued on next page.)

FOREIGN PATENT DOCUMENTS

| | | |
|---|---|---|
| 0100097 | 2/1984 | European Pat. Off. |
| 2100556 | 12/1982 | United Kingdom . |
| 2113056 | 7/1983 | United Kingdom . |
| 2144608 | 3/1985 | United Kingdom . |

OTHER PUBLICATIONS

Rubin et al. "A 3-Dimensional Representation for Fast Rendering of Complex Scenes" ACM Computer Grpahics Jul. 1980 pp. 110-116.

Schachter, J. B. "Computer Image Generation" A Wiley-Interscience Publication 1983.
Proceedings IECON '84, Industrial Applications of Micro-Electronics, Oct. 22-26, 1984, IEEE (Tokyo,
(List continued on next page.)

Primary Examiner—Phu K. Nguyen
Attorney, Agent, or Firm—Georgann S. Grunebach; Terje Gudmestad; W. K. Denson-Low

[57] ABSTRACT

A system using a ray-tracing algorithm and a hierarchy of volume elements (called voxels) to process only the visible surfaces in a field of view. In this arrangement, a dense, three-dimensional voxel data base is developed from the objects, their shadows and other features recorded, for example, in two-dimensional aerial photography. The rays are grouped into subimages and the subimages are executed as parallel tasks on a multiple instruction stream and multiple data stream computer (MIMD). The use of a three-dimensional voxel data base formed by combining three-dimensional digital terrain elevation data with two-dimensional plan view and oblique view aerial photography permits the development of a realistic and cost-effective data base. Hidden surfaces are not processed. By processing only visible surfaces, displays can now be produced depicting the nap-of-the-earth as seen in low flight of aircraft or as viewed from ground vehicles. The approach employed here is a highly-parallel data processing system solution to the nap-of-the-earth flight simulation through a high level of detail data base. The components of the system are the display algorithm and data structure, the software which implements the algorithm and data structure and creates the data base, and the hardware which executes the software. The algorithm processes only visible surfaces so that the occulting overload management problem is eliminated at the design level. The algorithm decomposes the image into subimages and processes the subimages independently.

18 Claims, 10 Drawing Sheets

U.S. PATENT DOCUMENTS

| | | | |
|---|---|---|---|
| 4,583,185 | 4/1986 | Heartz | 364/521 |
| 4,590,569 | 5/1986 | Rogoff et al. | 364/452 |
| 4,622,632 | 11/1986 | Tanimoto et al. | 364/200 |
| 4,625,290 | 11/1986 | White | 364/522 |
| 4,631,690 | 12/1986 | Corthout et al. | 364/518 |
| 4,641,255 | 2/1987 | Hohmann | 364/522 |
| 4,660,157 | 4/1987 | Beckwith et al. | 364/520 |
| 4,685,070 | 8/1987 | Flinchbaugh | 364/522 |
| 4,694,404 | 9/1987 | Meagher | 364/518 |
| 4,727,474 | 2/1988 | Batcher | 364/200 |
| 4,805,121 | 2/1989 | Scott et al. | 364/522 |
| 4,847,788 | 7/1989 | Shimada | 364/522 |
| 4,847,789 | 7/1989 | Kelly et al. | 364/522 |

OTHER PUBLICATIONS

Japan), H. Nishimura et al.: "A multicomputer system lins: its architecture and graphics applications," pp. 270–274.

Computer Graphics 80, Aug. 1980 (Fareham, Hants, GB), T. Rowley: "Computer generated imagery for training simulators," pp. 223–232.

Proceedings of the IEEE 1984 National Aerospace and Electronics Conference, Naecon 1984, May 21–25, 1984, vol. 2 of 2, IEEE (US), O. Marvel et al.: "Image synthesization for simulation, stimulation and training," pp. 884–900.

Fig. 1a.
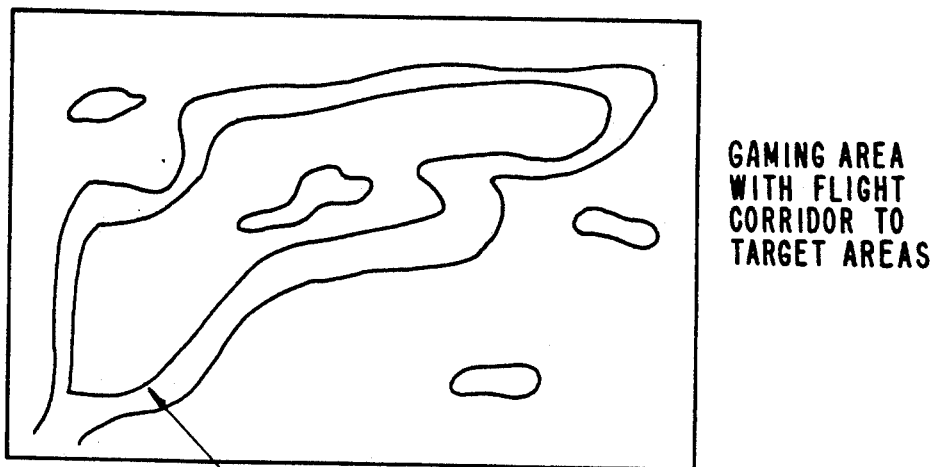
GAMING AREA WITH FLIGHT CORRIDOR TO TARGET AREAS
DETAIL OF FLIGHT CORRIDOR
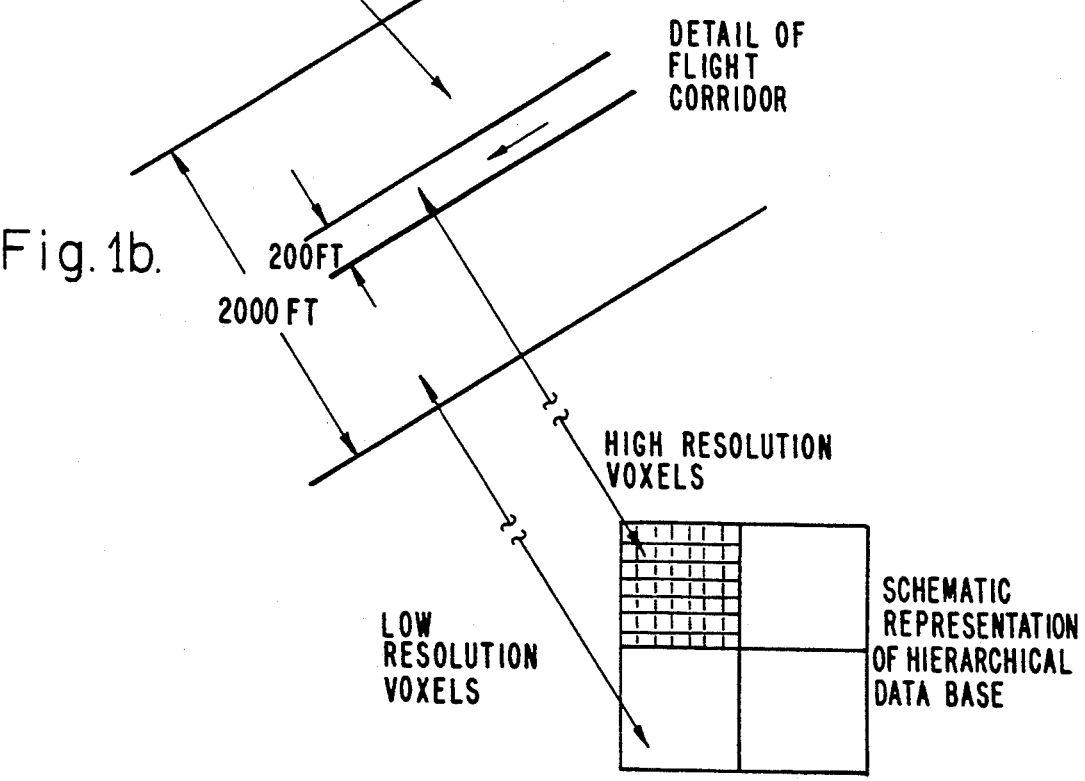
Fig. 1b.  200 FT
2000 FT
HIGH RESOLUTION VOXELS
LOW RESOLUTION VOXELS
SCHEMATIC REPRESENTATION OF HIERARCHICAL DATA BASE
Fig. 1c.

DIGITAL VISUAL AND SENSOR SIMULATION SYSTEM FOR GENERATING REALISTIC SCENES

This is a continuation of application Ser. No. 06/925,855, filed Sep. 11, 1986, abandoned.

BACKGROUND OF THE INVENTION

1. Field of the Invention

This invention relates generally to visual and sensor simulation systems and, more particularly, to digital visual and sensor simulation systems useful in providing static or dynamic perspective displays of realistic scenes. These scenes may be of real geographic areas or imaginary areas. For the visual simulation, the eye is the sensor; however, the invention also covers the simulation of infrared (IR) and radar sensor displays. The invention is used to train air (planes, helicopters), sea (ships, submarines), and ground (tanks) personnel. The invention is also used for air, ground or sea mission planning, crew preparation, and crew mission training.

2. Description of Related Art

Current visual and sensor simulation systems process a hierarchy of polygons using hidden surface algorithms on pipelined computer architectures. Polygon data bases are interpolated in real time to generate dense images of picture elements (pixels). Because the data bases of polygon systems tend to be sparse in relation to the data demands, realistic images of actual geographic areas cannot be produced. The processing requirements of polygon systems, using hidden surface algorithms, tends to overload current systems trying to simulate low flight as the viewer looks off at the horizon under clear atmospheric conditions, for the number of hidden surfaces behind each pixel and the number of polygons in the field of view rises very rapidly.

A book entitled *Computer Image Generation*, edited by Bruce J. Schacter, Copyright 1983, makes reference to three-dimensional data bases. In its various chapters, it treats simulation techniques and training effectiveness. Algorithms and architectures (together with block diagrams of some architectures) used in several computer graphic systems are discussed. Aspects of database design in terms of modeling of ground features in the data base to be of the same size, shape, location, color and texture, as the ground features seen by the pilot, are mentioned. Representations of terrains, culture and three-dimensional objects are reviewed. Representations of solids, by octree encoding, algorithmic modeling and the use of second order equations for defining quadric objects are considered. The development of terrain data bases, culture data bases and object/model data-bases is touched upon as are points of consideration in the design of very large scale integration circuits.

SUMMARY OF THE INVENTION

This invention improves computer image generated (CIG) displays, while reducing data demands, in the provision of a system using a ray-tracing algorithm and a hierarchy of volume elements (called voxels) to process only the visible surfaces in a field of view. In this arrangement, a dense, three-dimensional voxel data base is developed from the objects, their shadows and other features recorded, for example, in two-dimensional aerial photography. The rays are grouped into subimages and the subimages are executed as parallel tasks on a multiple instruction stream and multiple data stream computer (MIMD).

The use of a three-dimensional voxel data base formed by combining three-dimensional digital terrain elevation data with two-dimensional plan view and oblique view aerial photography permits the development of a realistic and cost-effective data base.

Hidden surfaces are not processed. By processing only visible surfaces, displays can now be produced depicting the nap-of-the-earth as seen in low flight of aircraft or as viewed from ground vehicles. Such displays normally have a large number of hidden surfaces which are not required to be processed in achieving realism. Images produced using this visible surface approach contain real objects (such as buildings and cars) and terrain features providing scene texture. Images are processed using parallel tasks. By employing a large number of parallel tasks (say, 1,000), a large number of slower, very large scale integrated circuit (VLSI) processors may be employed. Alternatively, a smaller number of faster processors can also be used. Still other parallel data processing techniques may be employed. The very large scale integrated processor is both cost-effective and efficient in the execution of instructions and in memory management of a complex memory hierarchy.

The approach employed here is a highly-parallel data processing system solution to the nap-of-the-earth flight simulation through a high level of detail data base. The components of the system are the display algorithm and data structure, the software which implements the algorithm and data structure and creates the data base, and the hardware which executes the software. The algorithm processes only visible surfaces so that the occulting overload management problem is eliminated at the design level. The algorithm decomposes the image into subimages and processes the subimages independently. A subimage is a group of adjacent pixels; e.g. (1) an N×M rectangle of pixels, (2) if M=N, we have a square subimage, (3) if N=1 and M=Total Number of Horizontal Scan Lines, then a single verticle scan line in the subimage and (4) if N=M=1, a single pixel is the subimage. No clipping of partially visible surfaces is required by the algorithm for each subimage.

A separate software task is created for each subimage. The code or logic in each task is identical but the input parameters for each subimage vary and the data processed from the data base varies with each task. These tasks can be executed in parallel because they process each subimage independently.

A multiple instruction stream, multiple data stream (MIMD), multiprocessor architecture or an instruction-flow type computer (described in a copending application Ser. No. 668,590, filed Nov. 5, 1984, entitled "Instruction Flow Computer," is useful in performing the parallel processing of these tasks. Software was tested and used in developing images on MIMD computers made by (1) DENELCOR, known as the HEP computer, (2) ELXSI, (3) Alliant, and (4) Perkin - Elmer. With the approach employed here, processing time is not dependent on scene complexity.

Any type of image projection system can be employed to project the computer-generated image onto a flat screen, or, onto a screen having the configuration of a dome. The ray tracing approach to accessing the data base as disclosed herein can accommodate either linear or nonlinear optics in the projection system, where the nonlinear optics could be designed to match the variable acuity of the eye.

The central requirement of a computer image generation system is to provide a high fidelity image, particularly in the area of interest. The three-dimensional voxel (volume element) algorithm approach used in the present invention is basically different from that of the conventional two-dimensional polygon (surface element) approach. In the three-dimensional approach, the high scene content is displayed in a natural manner, much like that seen by the human eye. This approach provides a new method in satisfying image delivery requirements. Many problems encountered by current visual systems are eliminated in the arrangement of this invention. For instance, the key requirements of nap-of-the-earth flight for high scene content, coupled with great detail, are addressed parametrically by this parallel voxel approach. This approach also handles viewpoint maneuverability, perspective and occultation automatically. Occultation overloads simply cannot occur since only visible surfaces are considered by the algorithm.

DETAILED DESCRIPTION OF THE DRAWINGS

The invention will be better understood by reference to the following specification when considered in conjunction with the accompanying drawings in which:

FIG. 1a depicts the gaming area with a flight corridor to the target areas;

FIG. 1b depicts a detail of the flight corridor shown at a somewhat enlarged scale;

FIG. 1c is a schematic representation of the hierarchical data base;

Figure 4:
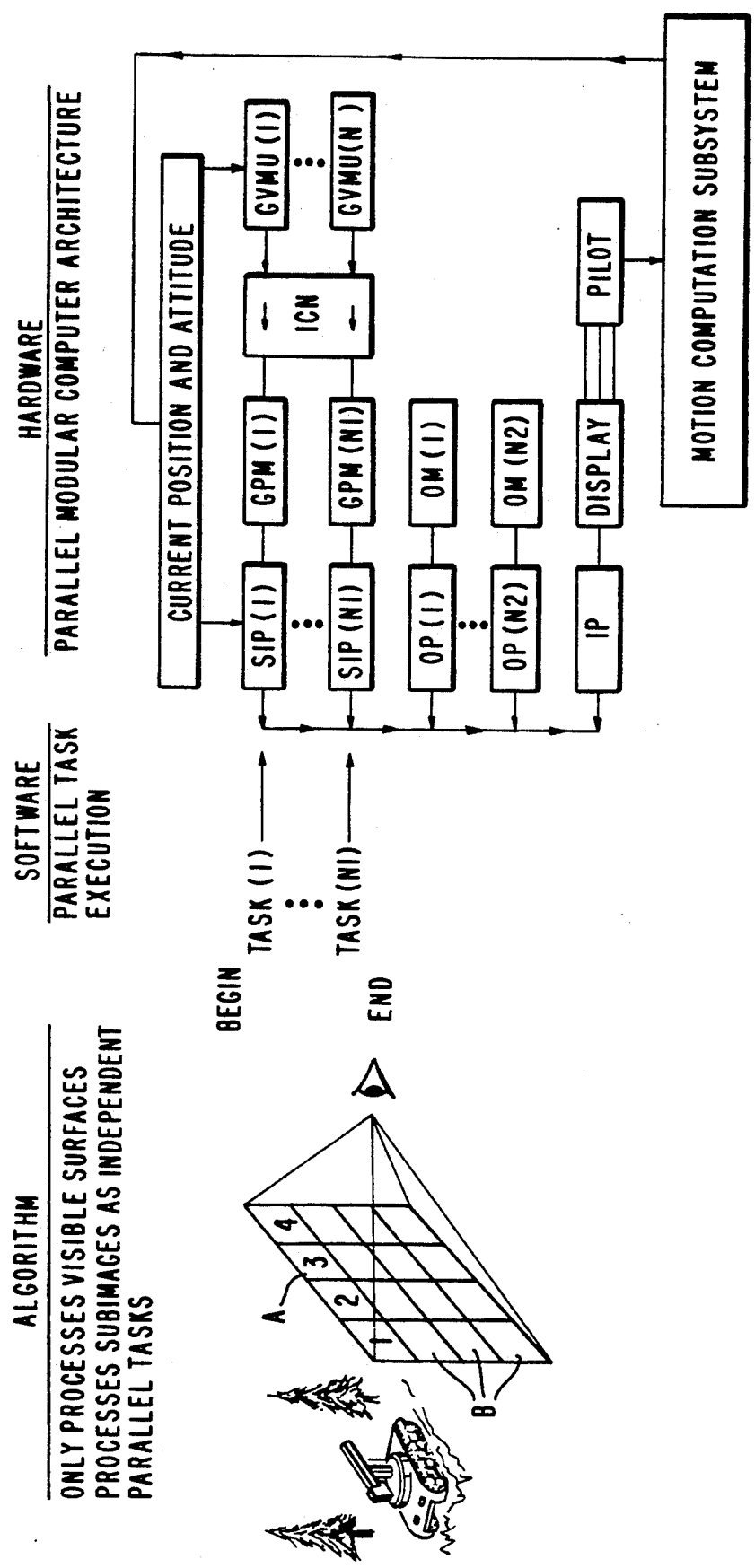
Figure 5:
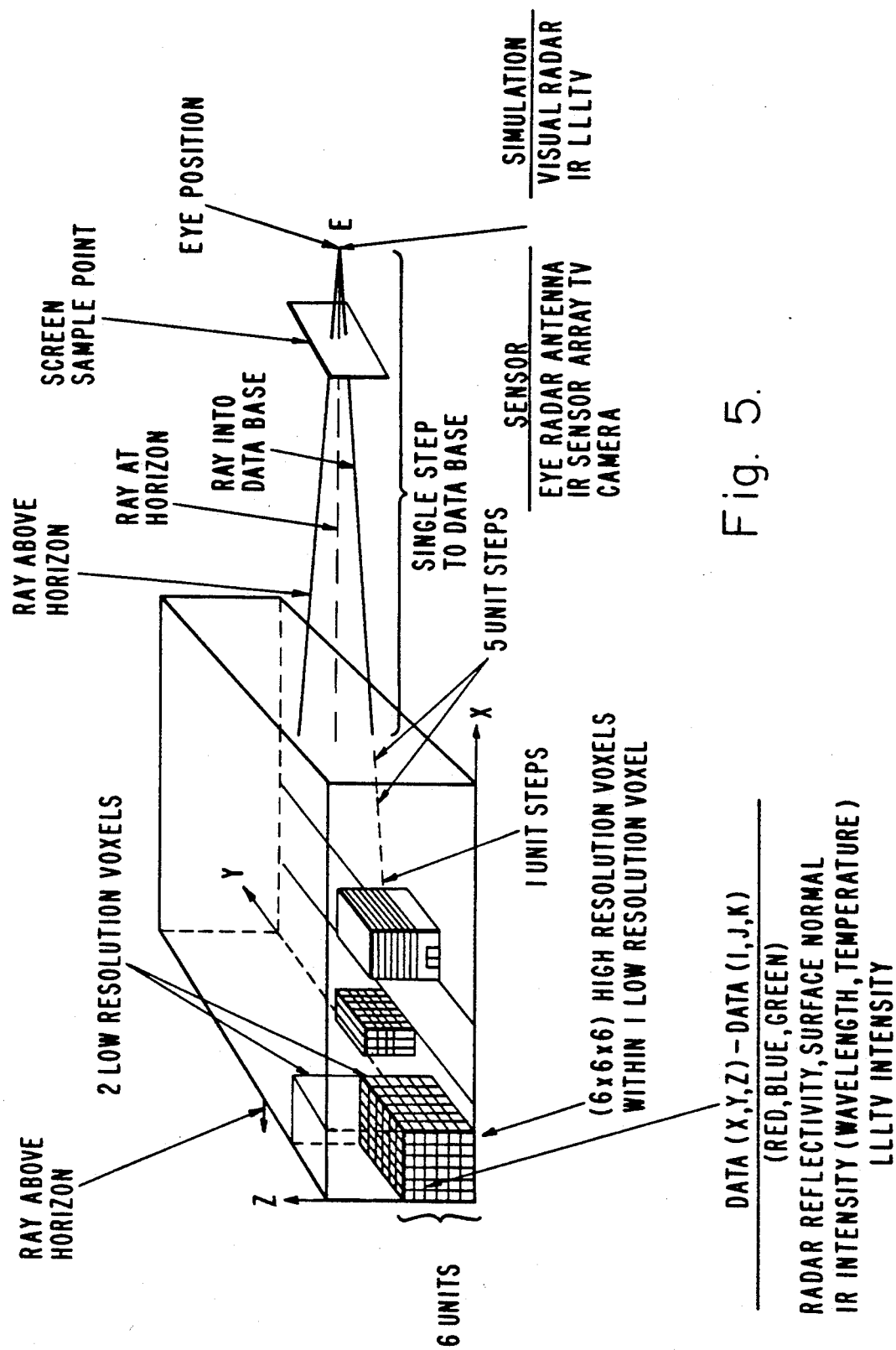
Figure 6:
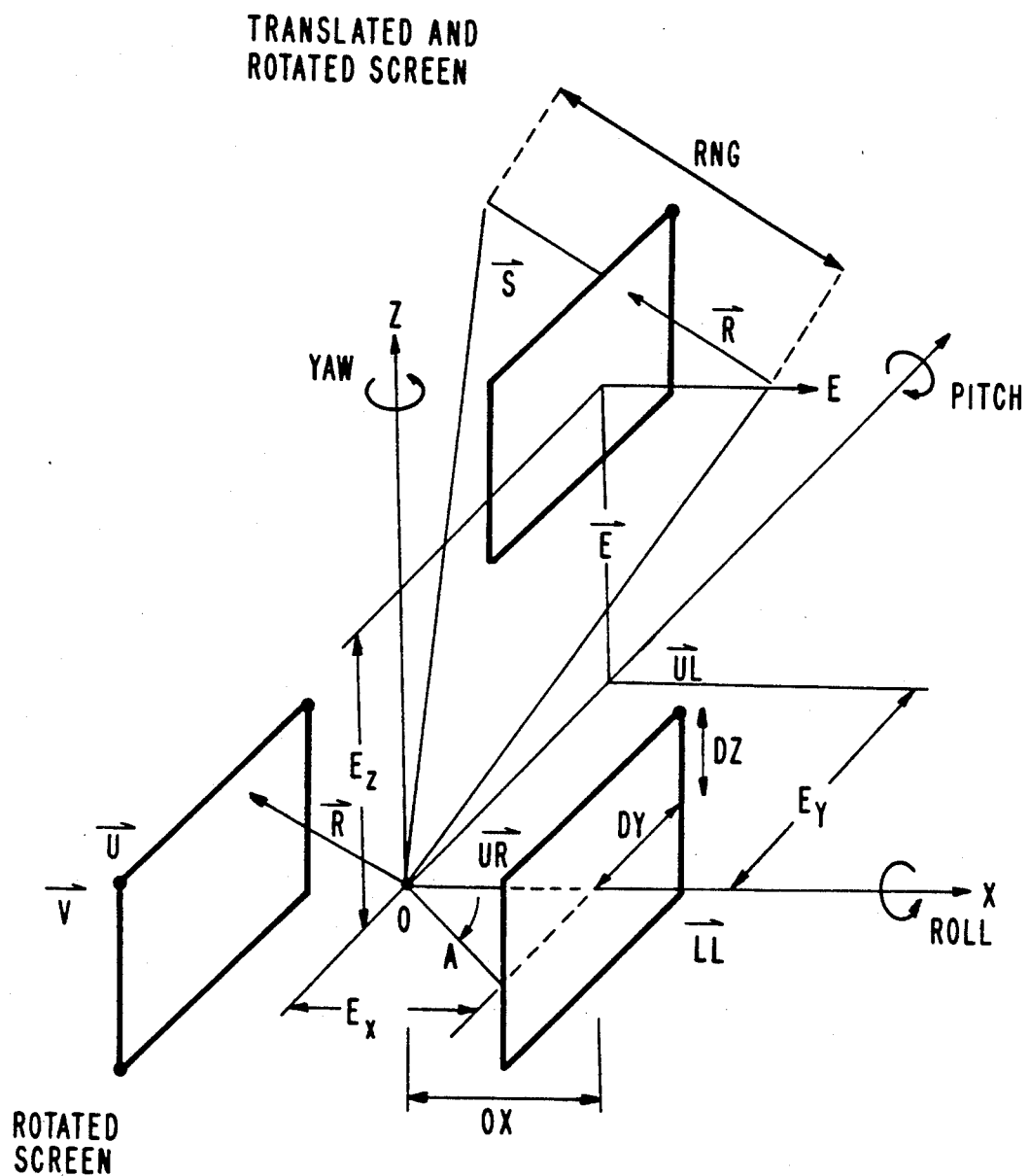
Figure 7:
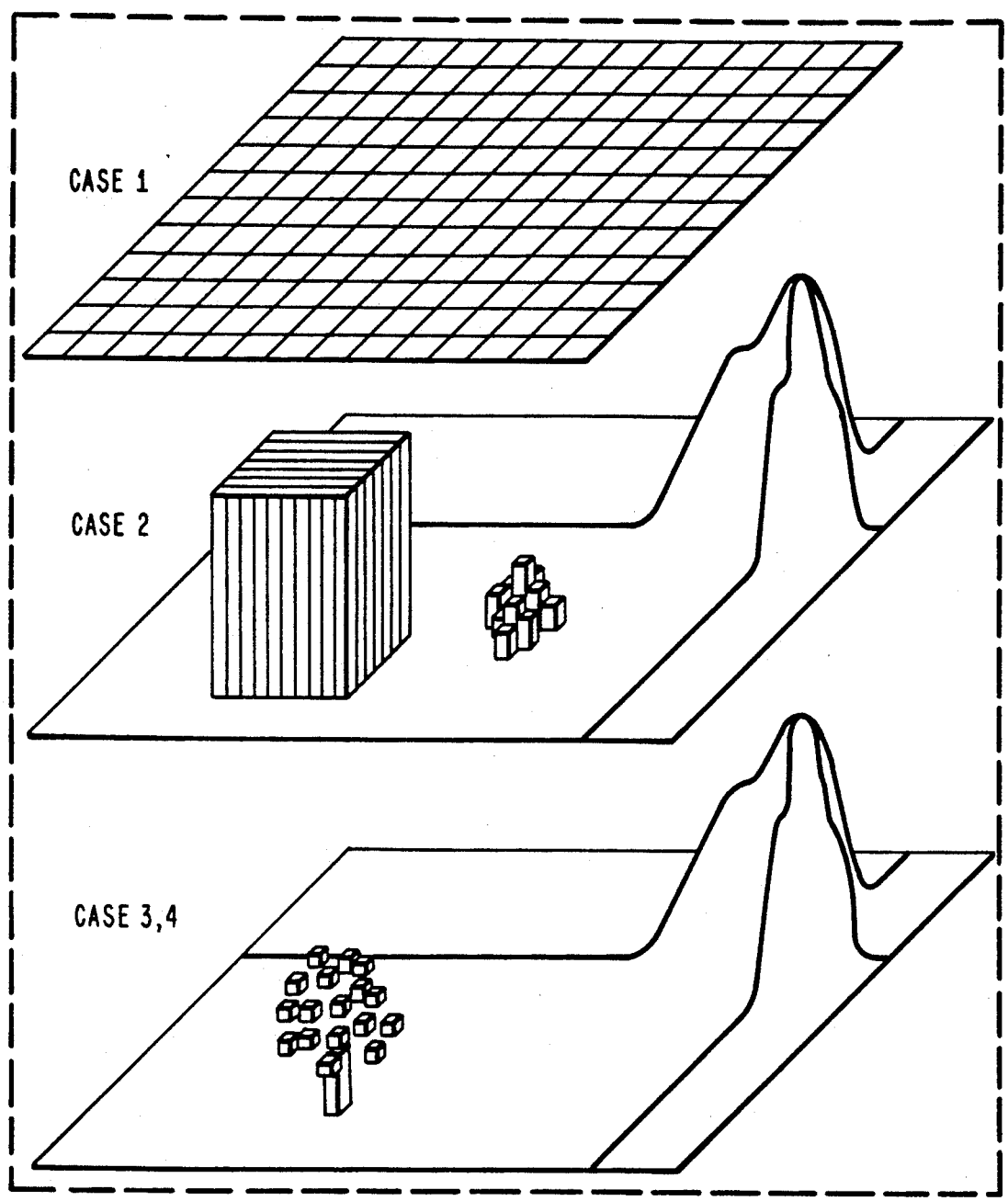

FIG. 4 relates the algorithm, the software and hardware aspects of this invention showing the organizational concept of the parallel modular computer architecture;

FIG. 5 is a visualization with ray stepping of the three-dimensional, visible surface algorithm of this invention;

FIG. 6 is a geometric representation defining the position of the eye, the screen, the ray and step vectors before and after current position and attitude transformations;

FIG. 7 shows representations of four different voxel data structures corresponding to four different cases of the three-dimensional visible surface display algorithm of this invention.

Figure 8:
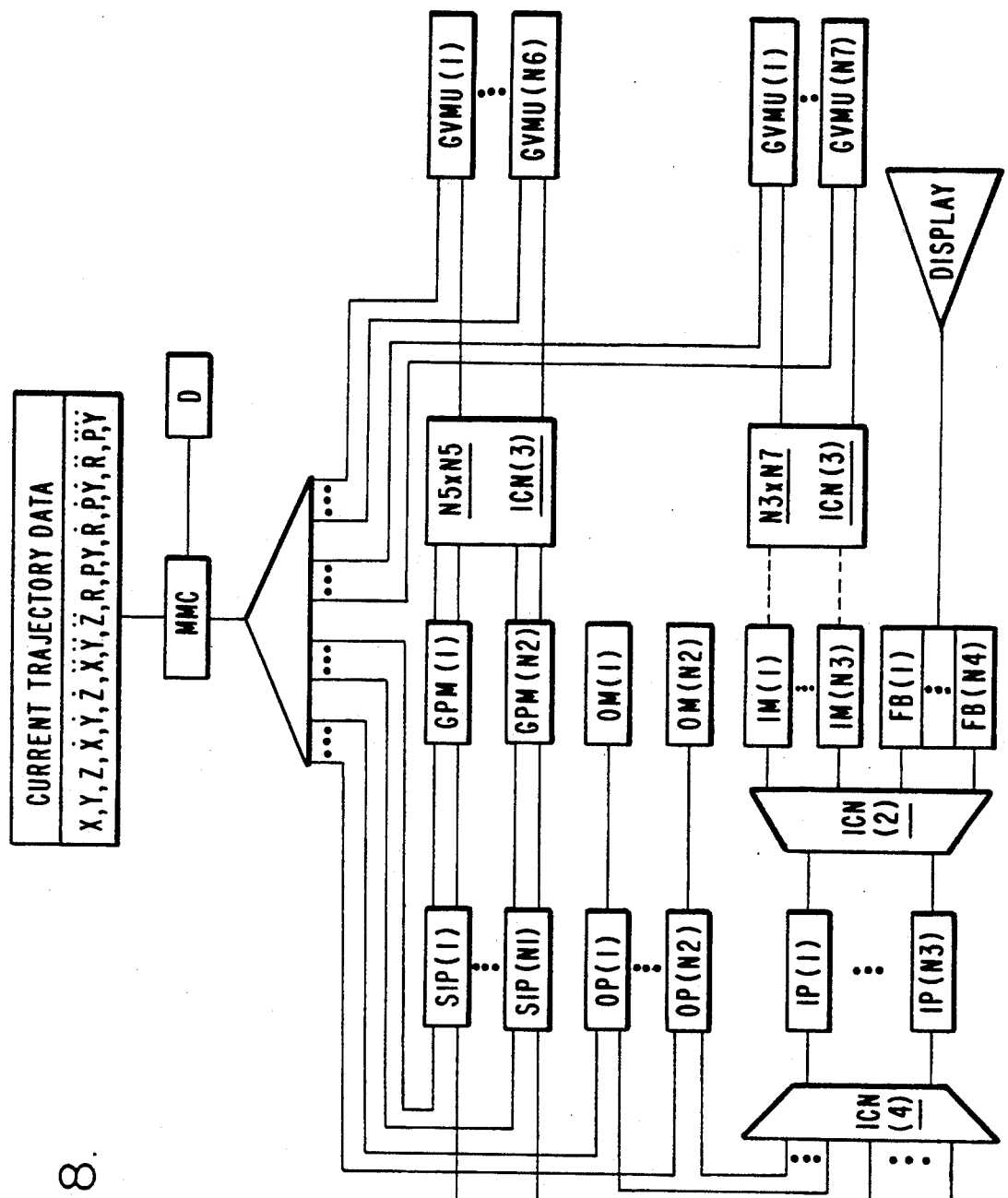
Figure 9:
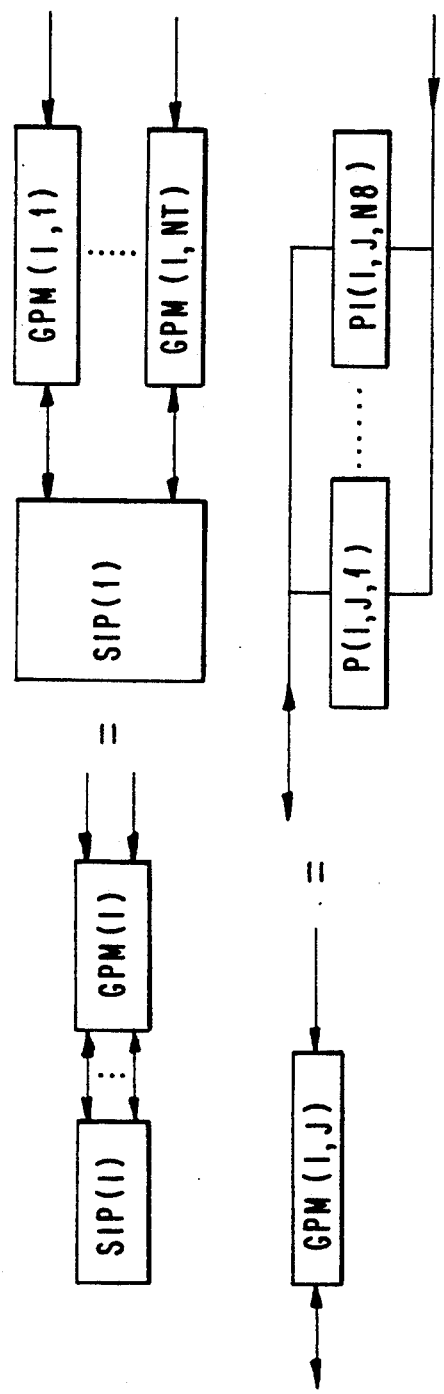

FIG. 8 is an implementation of two memory management approaches;

FIG. 9 depicts an organization of a global physical memory; and

Figure 10A:
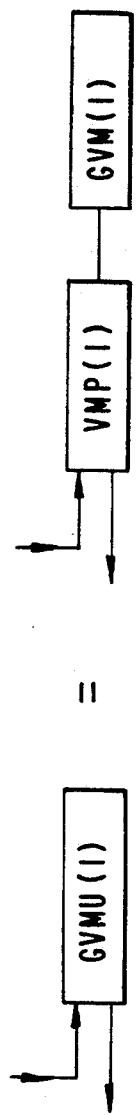
Figure 10B:
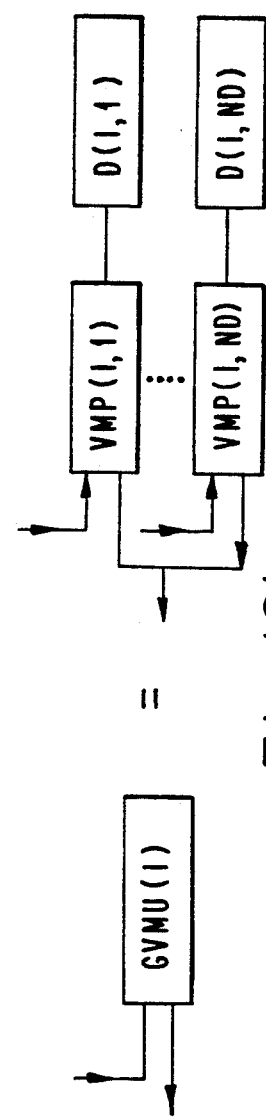
Figure 10C:
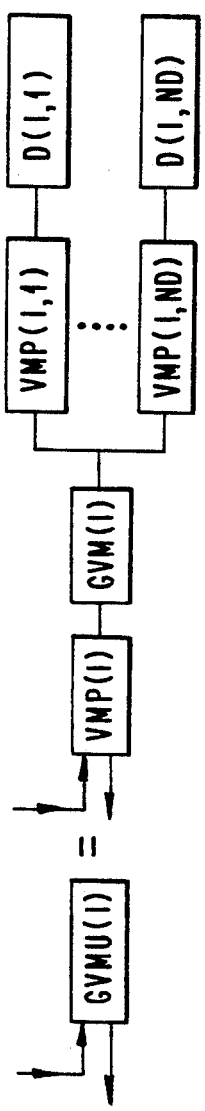

FIGS. 10a, 10b and 10c depict alternate organizations of global virtual memory to support static and dynamic memory management.

DESCRIPTION OF THE PREFERRED EMBODIMENT

In one of its aspects, this invention achieves the data source reduction by the technique of variable resolution. This is explained in connection with FIGS. 1a, 1b and 1c. FIG. 1a depicts the general gaming area with the arrow pointing to a particular point of interest which may be a flight corridor directed towards a target area. In FIG. 1b, this flight corridor is detailed at an enlarged scale typically representing a flight corridor roughly 200 feet wide in which there is a high area of interest and a second flight corridor, 2,000 feet wide, which depicts an area of lesser interest to the pilot, as the corridor to the target areas is flown. FIG. 1c schematically depicts the hierarchical data base that may be generated using this strategy. High resolution information storage cells called volume elements or voxels are shown in one area of the data base and these correspond to the area of interest in the 200 feet wide flight corridor. Lower resolution voxels or volume elements are depicted in another area of the schematic representation of the hierarchical data base and this information would correspond to a lesser detail in the 2,000 feet wide corridor.

The strategy of maintaining several levels of terrain resolutions and reducing resolution requirements outside of terrain corridors having a high area of interest, reduces data base data storage, access and transfer requirements. This also reduces the hardware requirements.

A data source with several levels of resolution distributed over the gaming area meets the requirements of a nap-of-the-earth computer generated image display system. In such an approach, the data base and transfer rates are reduced. This also reduces hardware costs.

In the flight corridors, such as the 200 foot wide corridor, resolution of 3.8 arc-minutes supports presentation of each accessory cue, such as identifiable trees, ground cover and buildings. At a 100 foot distance, a 1/10 of a foot resolution represents 3.0 arc-minutes. Data within the flight corridors, but outside the 100 feet distance, may be carried at 1 foot resolution. Elements of the gaming area not within the target acquisition or flight corridor areas may be carried at the much lower resolutions of 10 feet or even 100 feet.

While the worst-case platform motion specifications impose high data transfer rates, commercial mass storage facilities and computer interfaces, combined with intelligent placement of on-line scenario data, accommodate the data transfer.

The highest data resolution is 1/10 of a foot. Since a helicopter moves at speeds up to 50 knots, transfer of about 100 feet of new data along a high resolution corridor, such as the 200 foot corridor of FIG. 1b, is required each second. If the corridor of maximum resolution is 200 feet wide, the simulation of a helicopter moving through the corridor requires the transfer of about 10 megabytes per second. Lower resolution data requires a transfer capability of about 6 megabytes per second. For a fighter plane flying at low altitude and high speed the lower resolution data is sufficient to produce the blurred image seen out the window due to objects near the aircraft moving rapidly through the pilot's field of view.

Figure 2:
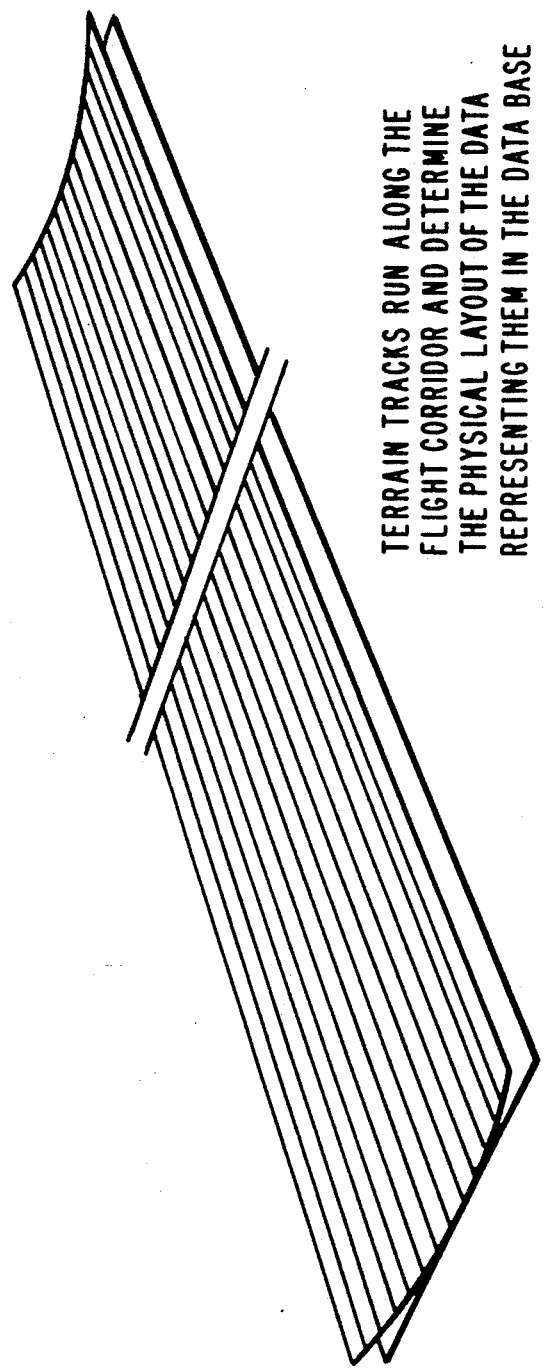
FIG. 2 depicts the terrain tracks along the flight corridor in the area of interest.

Extra storage is provided to compensate for seek and latency delays. Such storage may be provided on disks. Since seek and latency times reduce the transfer rates, the data base is designed so that these impediments are minimized. In accomplishing this, the terrain is divided along a corridor into equal geographical "tracks," as is seen in FIG. 2. The data for each of these tracks resides on separate, physical storage devices and is organized so that movement through a corridor results in the transfer of clustered data, thus minimizing the time required to move the read head of a disk, for example. Data is also stored with optimal physical block lengths to overcome the wasteful delays of latency. Ideally, all low resolution data resides in main memory at all times, such as the global virtual memories used in the system, yet to be described, with dynamic transfer of medium and high resolution data as the helicopter negotiates the gaming area. Such transfer is accomplished predictably from a subset of active input-output devices.

The transfer of medium and high resolution data is used to produce high quality imagery. This requires memory management of the system's memory hierarchy (disks, semiconductor memory, cache memory, registers). A memory management system controls the flow of data through the system to provide low and high resolution voxels where and when they are needed.

A combination of techniques is used to provide the data for these images. In general, the main computer image generating system accesses the data base to compute the projection of the landscape upon the display without overload or transport delay in excess of 100 ms. The processing power of the image delivery system is sufficient to meet the update rate for the worst-case of nap-of-the-earth low flight through a scene requiring a high level of detail in the data base. With the present invention, occultation overload does not occur. The transport time equals the retrace time; therefore, computational time for the worst-case image is invariant for this approach. The memory management system only needs to ensure that the relevant data is accessed from storage in a timely manner. This requires the establishment of data buffers in order to compensate for delays due to access times.

Thus, memory management ensures that the data buffers contain terrain data appropriate to the aircraft's motion projected over the next 30 image frames. Memory management requires that the hierarchical data segments for the low and high resolution areas be smoothly transferred to physical memory from virtual memory (such as a disk) and that pixel density of the image delivery system corresponds to the area of interest as indicated by the head or helmet sensor as conventionally used in head and eye tracking displays.

A general multiple-task trainer system requires real time simulation of the outside visual environment correlated with the inside sensor displays, which latter include radar, infrared displays and low light level TV. This external environment is composed of static land, sea, and atmospheric features. Also, dynamic sea and atmospheric effects and dynamic objects, such as tanks, ships, planes, helicopters, missiles and other weapon fire must be simulated.

The major subsystems of such a general multiple task trainer system perform:
1. data base modeling and creation;
2. visual computer image generation;
3. digital radar land mass simulation;
4. other sensor simulations;
5. motion computation (position and attitude) of the trainer platform and other dynamic objects; and
6. generation of simulation displays.

Figure 3:
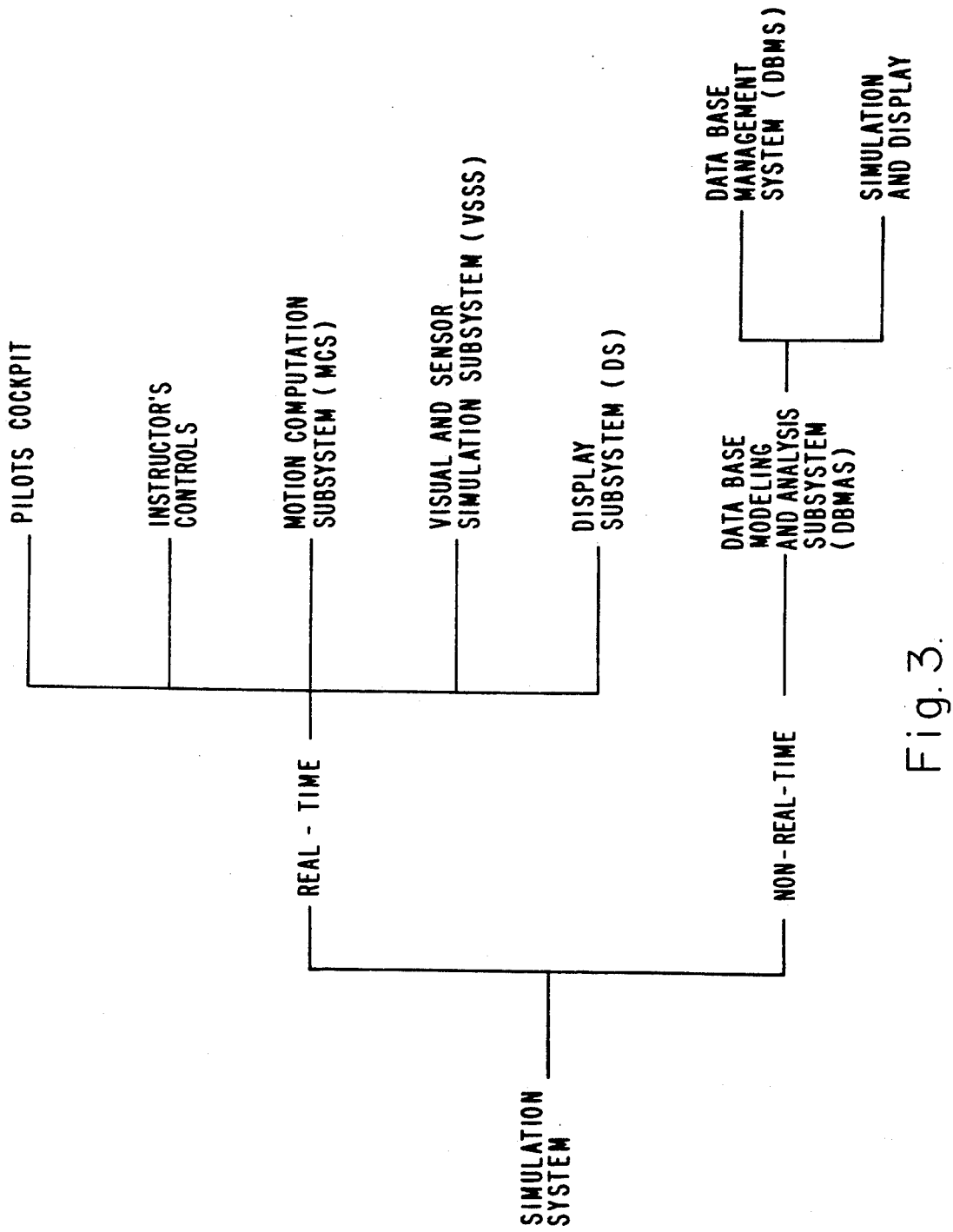
FIG. 3 depicts the organization of the real time and non-real time subsystems of this invention.

FIG. 3 shows the decomposition of the present invention into the non-real time and real time subsystems that perform these functions. In the real time system, the flow of data starts at the top with inputs from the pilot responding to the current displays. These inputs are processed by the motion computation subsystem to produce current and predicted positions and attitudes of the pilot's platform. The visual and sensor simulation subsystem uses the position and attitude to generate the visual and sensor information sent to the display subsystem. A unique feature of this invention resides in the utilization of the same software for developing and utilizing the data bases for both the non-real-time and the real-time subsystems of the simulation system. There is less data throughput in the non-real-time subsystem than in the real-time subsystem. The higher throughput is achieved by adding parallel data processing capacity in the real-time subsystem. For example, there may be 16 subimage processors in the visual and sensor simulation subsystem of the real-time side of the simulation system to achieve real-time image generation, while only one subimage processor may be required in the non-real-time side of the system to provide that aspect of the data processing requirement in image generation.

A simulation system for generating computer images can also be hierarchically decomposed into four types of objects. These are: algorithms and data structures; software; data bases; and hardware. This decomposition is seen in Table I.

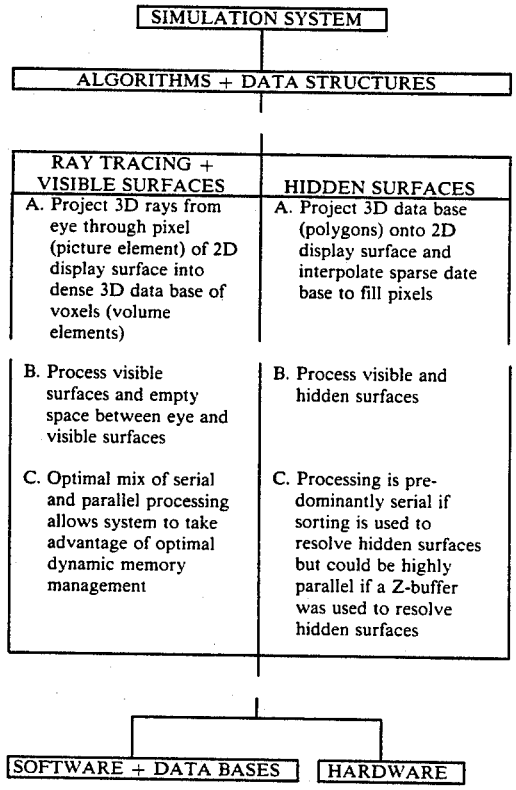

The interdependence of these four types of objects is apparent from this Table. A key feature evident from Table I is the dependence of the software, data bases, and hardware upon the selection of the processing algorithm and data structures. This dependence is the reason that the multiple instruction stream and multiple data stream computer hardware approach of this invention in implementing this simulation system is radically different from existing pipelined visual and sensor simulation systems. Thus, although the multiple instruction stream/multiple data stream implementation provides for the processing of rays in parallel, the processing of a collection of rays in a subimage in serial fashion permitted in this implementation allows the results of the previous ray's processing (that is, range, for example) to be used to minimize the processing of the next ray.

Improved realism in computer image generation requires an increase in the size of the data base to be processed in real time and the associated problem of sharing this data with many other data processors to support parallel processing. A multiple instruction stream/multiple data stream computer system provides a solution to this problem. In such a computer system, an interconnection network links the data base to parallel data processors. The design is one that easily partitions into a small number (10 or less) of distinct, 32-bit very large scale integrated circuits (VLSI) which are extensively replicated in this system. The first examples of these 32-bit VLSI multiprocessor systems are presently commercially available from new companies like Sequent, Alliant, and Encore. The parallel partitioning of the algorithms is ideally suited to the variable resolutions required by a head and eye tracked, high resolution area-of-interest system design.

FIG. 4 is a block diagram of such a system. The system has three major subsystems which work in parallel:

1. the subimage processors (SIP) compute an image of the terrain, static objects on the terrain, and the sky;
2. the object processors (OP) compute images of dynamic objects, points, lines, special targets and special effects; and
3. an image processor (IP) merges these images and prepares them for display.

The algorithms in the subimage processors and the object processors are optimized for their tasks, and are not necessarily the same. That is, the subimage processors use a three-dimensional visible surface algorithm with ray tracing (introduced in the discussion with respect to FIG. 5); while the object processors may use either the ray tracing algorithms or a hidden surface algorithm with polygons. While the object processors do not need to share their data bases in the object memories (OM), the subimage processors need access to the large terrain data base stored in the global virtual memory units (GVMU). They access the subset of the data base they need in their global physical memory (GPM), while the global virtual memory units (GVMU) supply the data the global physical memories will need next, through the interconnection network (ICN). The three-dimensional visual surface algorithm processes only visible surfaces, eliminating the occulting overload problem at the design level. The algorithm decomposes the screen A into subimages B, where four of the subimages in FIG. 4 are labeled 1 to 4, and processes these subimages independently. The algorithm requires no clipping of partially visible surfaces. A separate software task, individual tasks 1 to N1, is created for each subimage. The code or logic in each task is identical but the input parameters for each subimage vary and the data processed from the data base varies with each task. These tasks can be executed in parallel because they process each subimage independently. The algorithm is designed to minimize the logic executed in the average subimage task. The subimage processors employ a multiple instruction stream and multiple data stream computer architecture to perform the parallel processing of these tasks, where each of the N1 tasks assigned to the subimage processors may themselves be further decomposed into parallel tasks.

THREE DIMENSIONAL VISIBLE SURFACE ALGORITHM

The three-dimensional visible surface algorithm can be visualized in FIG. 5. The position of the viewer's eye and the position of the perimeter of the display surface define the field of view, and potential rays starting at the eye and passing through screen sample points. The display surface or screen, while shown as planar, also may be curved (e.g., spherical). The screen's spatial resolution of picture elements (pixels) and spectral resolution (number of colors and quantization levels per color) define the static quality of a display frame. The temporal resolution, or frame update rate (e.g., 30 frames per second), defines the dynamic quality of the display system.

FIG. 5 shows the data base or gaming area with buildings and the eye position and screen outside the data base. The data base is defined over the X, Y plane at the appropriate terrain or object elevation value Z (X, Y). The initial position vectors of the eye, E, and the upper left UL, lower left LL, and upper right UR corners of the screen are shown in FIG. 6. The eye is initially at the origin O looking down the X axis at the center of the screen which is at a distance DX=1 from the eye.

The algorithm uses the current attitude values of roll, pitch, and yaw to rotate the three corners of the screen about the origin. The rotated values are then used to form scaled vectors (U, V) that can be used to compute the position vector of a ray (R), and the normalized ray vector Q. The tail of ray vector R is at the eye E, and its head is at the sample point on the screen indexed by multiples of U and V, or R(PIX, LIN) with PIX multiples of U and LIN multiples of V.

The following refers to FIG. 6:

Note: The arrow E indicates that the eye's position is translated from the origin at (O, O, O) to its current position at (EX, EY, EZ)

$\overline{E}$=(O, O, O)→(EX, EY, EZ)
$\overline{UL}$=(DX, DY, DZ)
$\overline{LL}$=(DX, DY, −DZ)
$\overline{UR}$=(DX, −DY, DZ)
DX=1
A=0.5*(horizontal FOV)
DY=DX*TAN(A)=TAN(A)
N_PIX=No. pixels per line and No. vertical scan lines

*—a single asterisk indicates multiplication
**—a double asterisk means raising to a power N_LIN=No. horizontal scan lines
DZ=(N_LIN/N_PIX)*DY
$\overline{U}$=($\overline{UR}$−$\overline{UL}$)/N_PIX
$\overline{V}$=($\overline{LL}$−$\overline{UL}$)/N_LIN
$\overline{R}$=$\overline{UL}$−0.5($\overline{U}$+$\overline{V}$)+(PIX*$\overline{U}$)+(LIN*$\overline{V}$)
PIX=1, 2, ..., N_PIX
LIN=1, 2, ..., N_LIN
NORM($\overline{R}$)=SQRT(R(1)2+R(2)2+R(3)**2)

*—a single asterisk indicates multiplication
**—a double asterisk means raising to a power The indices (PIX, LIN) are used to locate the center of a particular pixel that the ray vector is directed towards. The ray vector's tail is at the eye which is initially at the origin, and in general the ray vector R, normalized ray vector Q, and step vector S are defined by:

$\overline{R}$=(vector to pixel center)−(eye vector)
$\overline{Q}$=$\overline{R}$/NORM($\overline{R}$)
$\overline{S}$=$\overline{E}$+RNG*$\overline{Q}$ The ray vector is invariant to the translation of the eye to its current position at (EX, EY, EZ). The algorithm proceeds to step along the ray from the eye and uses its current step position:

$$\bar{S} = \bar{E} + RNG * \bar{Q}$$
$$RNG = RNG * NORM(\bar{Q}) = NORM(\bar{S} - \bar{E})$$

to access the data base and determine if the first opaque voxel has been reached, where RNG is the range or distance between the eye and the current step position. This representation of S is analogous to the parametric representation of a line determined by two points (X1, Y1, Z1) and (X2, Y2, Z2), using the parameter t:

$$X = X(t) = X1 + t(X2 - X1)$$

$$Y = Y(t) = Y1 + t(Y2 - Y1)$$

$$Z = Z(t) = Z1 + t(Z2 - Z1)$$

where t=0 and 1 determines the start and end points. If the solution of the first equation for t as a function of X is substituted into the second two equations, then the following nonparametric equations for Y(X) and Z(X) result:

$$Y(X) = Y1 + [(Y2 - Y1)/(X2 - X1)](X - X1)$$

$$Z(X) = Z1 + [(Z2 - Z1)/(X2 - X1)](X - X1).$$

A similar set of equations exists for the step vector which are independent of the RNG parameter:

$$S(1) = E(1) + RNG * Q(1)$$

$$S(2) = E(2) + RNG * Q(2)$$

$$S(3) = E(3) + RNG * Q(3)$$

$$RNG = [S(1) - E(1)] / Q(1)$$

$$S(2) = [E(2) - (Q(2)/Q(1)) * E(1)] + [Q(2)/Q(1)] * S(1)$$

$$S(3) = [E(3) - (Q(3)/Q(1)) * E(1)] + [Q(3)/Q(1)] * S(1)$$

where I=1, 2, 3 and S(I) represents the X, Y, and Z components. The Q vector's components are the ray vector's direction cosines:

$$
\begin{aligned}
Q &= R/NORM(R) = Q(1)i + Q(2)j + Q(3)k \\
  &= (Q(1), Q(2), Q(3)) \\
Q(1) &= Q * i = NORM(Q)NORM(i)\cos A(Q, i) \\
     &= \cos A(Q, i) \\
Q(2) &= Q * j = \cos A(Q, j) \\
Q(3) &= Q * k = \cos A(Q, k)
\end{aligned}
$$

where i, j, and k are unit vectors pointing down the X, Y, and Z axes, and A(Q, i) is the angle between the Q and i vectors.

Each ray can be processed in parallel and no hidden surfaces are processed. A pseudocode representation of the software which implements the parallel process of stepping along a ray through a hierarchical voxel data base is setforth below. The hierarchy has four levels in this example. Range thresholds, TH_L, (where L is 1, 4, 16, 64) are used at each level so that the appropriate coarse resolution color or sensor data is used when the range exceeds these thresholds. This effectively allows the ray to thicken or spread as the range increases from the eye by returning only color values, C_L, from the larger, coarser resolution voxels when the range exceeds these thresholds, and has an anti-aliasing effect which is built into the hierarchical voxel data base as a preprocessing step, before any repetitive image generation takes place. This algorithm not only models the reflection of visible solar illumination along rays from reflecting surfaces to the viewer's eye, but also models the IR emission and reflection along the same rays being received by an IR sensor or the reflection of radar beams being received by a radar antenna.

---

STEPPING LOOP ALONG RAY THROUGH PIXEL INDEXED BY (I,J), AND THROUGH HIERARCHY OF VOXELS (L = 1, 4, 16, 64) USING PSEUDOCODE

```
IF (RAY IS ONE OF THE INITIAL RAYS IN SUBIMAGE) THEN
    RNG = 0; (START STEPPING FROM EYE)
ELSE
    INITIALIZE RANGE USING VALUES FROM NEARBY RAYS; (RANGE
      COHERENCE)
END IF
INITIALIZE X(I), S(I) AT LEVEL 64;
WHILE (ST_64(S(1), S(2), S(3)).NOT.OPAQUE)
    STEP AT LEVEL 64 TO NEXT X(I) AND COMPUTE S(I);
END WHILE;
COMPUTE RNG;
R_64(I,J) = RNG;
IF (RNG.GT.TH_64) THEN
    C(I,J) = C_64(S(1), S(2), S(3));
    R(I,J) = RNG;
ELSE
    INITIALIZE X(I), S(I) AT LEVEL 16;
    WHILE (ST_16(S(1), S(2), S(3)).NOT.OPAQUE)
        STEP AT LEVEL 16 TO NEXT X(I) AND COMPUTE S(I);
    END WHILE;
    COMPUTE RNG;
    IF (RNG.GT.TH_16) THEN
        C(I,J) = C_16(S(1), S(2), S(3));
        R(I,J) = RNG;
```

STEPPING LOOP ALONG RAY THROUGH PIXEL INDEXED BY (I,J), AND THROUGH HIERARCHY OF VOXELS (L = 1, 4, 16, 64) USING PSEUDOCODE

-continued

```
    ELSE
        INITIALIZE X(I), S(I) AT LEVEL 4;
        WHILE (ST_4(S(1), S(2), S(3)).NOT.OPAQUE)
            STEP AT LEVEL 4 TO NEXT X(I) AND COMPUTE S(I);
        END WHILE;
        COMPUTE RNG;
        IF (RNG.GT.TH_4) THEN
            C(I,J) = C_4(S(1), S(2), S(3));
            R(I,J) = RNG;
        ELSE
            INITIALIZE X(I), S(I) AT LEVEL 1;
            WHILE (ST_1(S(1), S(2), S(3)).NOT.OPAQUE)
                STEP AT LEVEL 1 TO NEXT X(I) AND COMPUTE S(I);
            END WHILE;
            COMPUTE RNG;
            C(I,J) = C_1(S(1), S(2), S(3));
            R(I,J) = RNG;
        END IF
    END IF
END IF
```

VARIABLE DEFINITIONS

RNG = RANGE FROM EYE TO STEP POINT ALONG RAY
X(I) = LABLE OF INTEGER BOUNDARY POINT ALONG RAY
S(I) = VOXEL STEP INDICES RELATED TO X(I) BY: S(I) = X(I) + DELTA
L = 1, 4, 16, 64 = VOXEL HIERARCHY LEVEL = LENGTH OF SIDE OF VOXEL
ST_L(S(1), S(2), S(3)) = VOXEL STATE AT LEVEL L AND POSITION S(I)
C_L(S(1), S(2), S(3)) = VOXEL COLOR AT LEVEL L AND POSITION S(I)
TH_L = RANGE THRESHOLD AT LEVEL L
C(I,J) = SCREEN COLOR OF PIXEL INDEXED BY (I,J)
R(I,J) = RANGE WHEN STEPPING ALONG RAY TERMINATED
R_64(I,J) = RANGE WHEN STEPPING ALONG RAY AT LEVEL 64 TERMINATED

The range thresholds are computed by first evaluating the angle subtended by a single pixel $$A\_PIX = H\_FOV/N\_PIX$$

where the horizontal field of view is H_FOV and the number of pixels per line is N_PIX. The arc length subtended by this angle at range, RNG, is $$L = A\_PIX * RNG.$$

The range thresholds are defined by the range at which a voxel whose edge is length L units would fill the angle, A_PIX, if the voxel's surface normal were parallel to the ray down the center of A_PIX, so that $$TH\_L = L/A\_PIX = L*N\_PIX/H\_FOV = L*TH\_1.$$

An example of this sequence for TH_L is 611, 2445, 9779, and 39114 for L=1, 4, 16, and 64 with N_PIX=640 and H_FOV=60 degrees. Note that for a planar display, A_PIX is correctly evaluated for the center pixel, but increases as the rays progress towards the edge of the display.

The code that implements the STEP AT LEVEL L for each level in the hierarchy is similar in each case, and is the kernel software of the inner loops which yields the biggest return for optimization.

The stepping strategy of the algorithm is to step at a coarse resolution until the ray intersects an opaque voxel at that resolution. High resolution (L=1) steps are taken only if the range is less than TH_4, and then only after an opaque coarse resolution (L=4) voxel has been intersected. The color values of coarse resolution voxels are averaged over their interior higher resolution voxels.

The capability to shade objects and to correctly shape the shadows given an arbitrary polar and azimuth angle of solar illumination is provided by the shadow algorithm defined below.

SHADOW PRODUCING ALGORITHM

```
FOR ALL (VOXELS IN THE DATA BASE)
    INITIALIZE STEP POSITION AT CENTER OF
    VOXEL AT LEVEL 1;
    S10 = S1
    S20 = S2
    S30 = S3
    TAKE FIRST STEP;
    WHILE (ST_(S1,S2,S3).NOT.OPAQUE)
        STEP TO NEXT X(I) AND COMPUTE S(I);
        IF (S3.GT.Z_MAX) THEN GO TO END ALL
    END WHILE
    C_1(S1,S2,S3) = F*C_1(S1,S2,S3)
    .
    .
    .
    C_64(S10,S20,S30) = F*C_64(S10,S20,S30)
END ALL
```

Notes:
1. F = Shadow factor (E.G. F = 0.02)
2. Stepping loop terminates when either:
   (a) Ray intersects opaque voxel, or
   (b) Ray exits top of data base.
3. Voxel color at (S10,S20,S30) is:
   (a) Shaded in case 2-a,
   (b) Unchanged in case 2-b.

The strength of the volume element or voxel approach shown in FIG. 7 resides in the use of real aerial photography merged with digital terrain elevation data, followed by raising objects on the terrain to their appropriate Z values. The shadow length, L(S), of the object and the solar angle, A, computed from latitude, longitude, time of day, and day of the year are used to compute the Z value of the object by $$\tan A = Z/L(S)$$

$$Z = L(S) * \tan A.$$

This estimated Z value is fine tuned by adding a computed shadow to the real image and comparing the length of the computed shadow with the real shadow in the image. The Z value is then corrected to make these shadows the same length.

A list of the advantages and key features of the three-dimensional visible surface algorithm follows:
1. No hidden surfaces are processed; however, the empty space between the eye and the first opaque surface along the ray is processed.
2. No search of the full data base is required.
3. No data is processed which is outside the field of view; i.e., no "culling" or "clipping" are required.
4. No real time scan conversion is required because the algorithm and data structures (pixels, rays, voxels) are inherently compatible with raster scanning.
5. The algorithm is similar to:
    a. the eye seeing a real image using a real data base or the eye seeing an image on a screen;
    b. geometric optics and its use of ray tracing; and
    c. scattering, emission, and Monte Carlo simulations.
6. The algorithm is optimized for:
    a. large data bases with high information content;
    b. many hidden surfaces intersected along a ray; and
    c. low or nap of the earth flight.
7. The processing time is dependent on the resolutions of the screen and the data base.
8. The processing time is independent of data base complexity due to the number of objects or the rendering of objects.
9. The sampling density of the screen can vary to accommodate a high resolution area of interest.
10. The algorithm adapts easily for a non-planar screen.

Now referring back to FIG. 5, FIG. 5 also visualizes the hierarchial resolution data structure using two resolutions. The state (opaque, transparent, semitransparent) of low resolution volume elements or voxels is stored using two bits. Further memory is required to store the high resolution voxel data, such as color, only if the state is opaque or semitransparent. The voxels are randomly accessed as a three-dimensional array using the (X, Y, Z) value of the step vector (S) along the ray. For example, $S(1) = X$ is decomposable into a four level hierarchy by expressing X as a sum of bit fields:

$$\begin{aligned}
X &= X(31)X(3)\ldots X(1)\,X(0) \\
&= X(31) * (2^{**}31) + \ldots + X(1)*2 + X(0) \\
&= X(31,9) * 512 + X(8,6) * 64 + X(5,3) * 8 + X(2,0) \\
&= X(31,12) * 4096 + X(11,8) * 256 + X(7,4) * 16 + X(3,0) \\
&= X(31,12) * 4096 + X(11,7) * 128 + X(6,3) * 8 + X(2,0) \\
X(I,J) &= X(I)\,X(I-1)\ldots X(J)
\end{aligned}$$

where bit I of the binary representation of X is $X(I)$ and $X(I, J)$ is the bit field going from bit I down to bit J where I.GT.J. The three cases shown here have voxels of resoltuions (1, 8, 64, 512), (1, 16, 256, 4096) and (1, 8, 128, 4096), respectively. A list of the advantages of the hierarchial resolution data structure follows:
1. Minimizes system processing requirements:
    1.1 minimizes number of steps along a ray;
    1.2 allows steps of different resolutions or lengths; and
    1.3 attempts to use low resolution steps in empty space.
2. Minimizes system data memory requirements:
    2.1 memory is not required to store position data;
    2.2 position data is encoded in voxel's address; and
    2.3 attempts to store data on empty space in low resolution voxels and not in medium or high resolution voxels.
3. Allows random access of data by its position at different spatial resolutions.
4. Permits option of encoding data base at different resolutions, e.g., high resolution mission corridor surrounded by lower resolution ocean, desert, or farmland.
5. Allows use of semitransparent state of voxels for clouds, smoke, haze, or other atmospheric effects.
6. Accommodates range dependent level of detail by storing average values of higher resolution voxels in next lower resolution voxel (if a range threshold is exceeded, these lower resolution average values are used to terminate a search along a ray).
7. Aids the implementation of memory management by using the three dimensional (3D) position to label pages.
8. Assigns a separate set of parameters of the data structure consistent with the resolutions of each sensor.

If the eye is above the data base and the ray intersects the data base, then only one step is taken before entering the data base. To solve for the X, Y values where the ray intersects the top of the data base at ZMAX, it is necessary to determine the range RNG of the step S(I) along the normalized ray Q(I) where the new step height $E(3) + RNG * Q(3)$ equals ZMAX, or:

$$ZMAX = E(3) + RNG * Q(3)$$

$$RNG = (ZMAX - E(3))/Q(3)$$

$$X = E(1) + RNG * Q(1)$$

$$Y = E(2) + RNG * Q(2)$$

If the ray misses the data base or exits from the data base without intersecting an opaque surface, then the value of Q(3) determines whether the ray is above (Q(3).GT.0) or below (Q(3).LE.0) the horizon. Q(3).GT.0 means Q(3)>0, where
GT = Greater Than
LE = Less Than or Equal in Fortran If above, then the pixel can have the color of the sky appropriate to the magnitude of Q(3) with some haze along the horizon for small Q(3) blending into blue for large Q(3). If the ray is below the horizon, then modulo arithmetic is used to generate a duplication of the original data base over the (X, Y) plane. The stepping along the ray proceeds through the duplicated data bases until an opaque surface is reached or S(3) is greater than ZMAX.

A range buffer approach is used to combine the images of the static data base with dynamic objects. This approach is similar to the popular Z-buffer algorithm.

The range between the eye and the first opaque voxel along a ray is used to determine which voxel is nearer to the viewer and should be displayed. The range can be evaluated without using the square root; e.g., $RNG = (S(1) - E(1))/Q(1)$.

The three-dimensional visible surface display algorithm references the data base using X(I), Y(J) and Z(K) and allows a general distribution of volume elements or voxels at these three-dimensional grid points. This is the highest performance version of the display algorithm, but it also requires the most address computation and the most memory.

FIG. 7 visualizes the four voxel data structures that correspond to the four cases of the three-dimensional visible surface display algorithm summarized in Table II. In all cases, the two-dimensional surface voxel data values (e.g., R=Red, G=Green, B=Blue) can be defined by aerial photography. Case 1 is the same as an image array of picture elements or pixels. Cases 2, 3 and 4 require terrain elevation data Z(X, Y), whereas Case 1 has no elevation data.

S(3) is less than or equal to the low resolution value of Z.

In Case 2, the aerial photography is registered to the elevation data Z(X, Y) resulting in a smooth continuous mapping onto the real terrain contours. In addition, when objects like buildings, cylindrical storage tanks, or conical (coniferous) trees are recognized, they are grown as discontinuities above this smooth Z(X, Y) surface. This growth of objects is shown in Case 2 of FIG. 7. The modeling constraint for Case 2 is that objects are always opaque and that there are no color changes in the Z direction over an (X, Y) point. Within this constraint, each of the four walls and the top of the building are different shades of the same color to represent proper sun angle and surface reflectivity. Case 3 allows the vertical distribution of opaque voxels to construct objects, such as trees, bushes, or telephone lines that have transparent holes in the vertical direction.

The memory required for these cases using different size gaming areas and grid resolutions is discussed be-

TABLE II

FOUR CASES OF 3D VISIBLE SURFACE ALGORITHM AND DATA

| | Mathematical Description | Data Structure | Array Indices Used to Compute Record Address | Fields of Record | Processing of Algorithm |
|---|---|---|---|---|---|
| 1. | Single Valued 2D Surface at Z(X,Y) = 0 | 2D Array of Records | X,Y | R,G,B | Single Step along Ray from Eye to Z(X,Y) = 0 |
| 2. | Single Valued Discontinuous 2D Surface at Z(X,Y) | 2D Array of Records | X,Y | R,G,B,Z | Step along Ray from Eye until S(3).LE.Z |
| 3. | Single Valued Discontinuous 2D Surface at Z(X,Y) Plus Multiple (e.g, 2 to 5) Voxels above Z(X,Y) | 2D Array of Records | X,Y | R,G,B,Z; R1,G1,B1,Z1; R2,G2,B2,Z2; ... | Step along Ray from Eye until S(3).LE.Z or S(3).EQ.Z1 or S(3).EQ.Z2 or ... |
| 4. | Version 3 with Potentially Large Multiple (e.g., 6 or Greater) of Voxels over Z(X,Y) | 3D Array of Records | X,Y,Z | ST,R,G,B | Step along Ray from Eye until ST.EQ. Opaque |

R.G.B = Red, Green, Blue
ST = State of Voxel = Transparent, Semitransparent, Opaque, Fill (for Concavities)
S(3) = Z Component of Step Vector Ray tracing in Case 1 requires only one step to Z(X, Y)=0 and a computation where the ray intersects the (X, Y) plane. This computation is identical to the computation discussed earlier where a ray intersects the top of the data base at ZMAX, only now ZMAX=0. In cases 2 and 3, multiple steps are required. At each step position S(I), where I=1, 2, and 3 corresponds to X, Y and Z, the S(1) and S(2) values are used to reference the data and S(3) is compared with the Z value stored at that (X, Y) address. In Case 2, the stepping terminates when S(3) is less than or equal to Z and in Case 3, the stepping terminates if that condition is true or if S(3) equals Z1 or Z2. In both Cases 2 and 3, a hierarchy of resolutions can be used to minimize the number of steps along a ray. For example, if 1, 10 and 100 foot resolutions are used, then on a 10 foot grid, the maximum data value Z is stored at its 1 foot locations; and on a 100 foot grid the maximum value of Z is stored at its 10 foot locations. Stepping then continues at low resolution when S(3) is above the low resolution value of Z. Stepping at the next higher resolution takes place only when low. Table III shows the number of grid points for different gaming area sizes and three different grid resolutions. The bytes per voxel and grid points that each data structure requires are listed in Table IV, where there is assumed one byte of color data (e.g., Red=3, Green=2, Blue=3), and Z values are stored as two byte integers (e.g., Z=0, 1, ..., 65535). In Case 3, it is assumed that two voxels above the third at the Z(X, Y) surface are sufficient to model trees and bushes. If the number of grid points in a gaming area is multiplied by the number of bytes per grid point for a particular data structure, the size of the memory required in megabytes is found. Therefore, the memories required for the three gaming areas and their corresponding grid resolutions are 140, 420 and 1260 megabytes (MB) when using data structure Cases 1, 2 and 3, respectively.

TABLE III
GRID POINTS FOR DIFFERENT GAMING AREA SIZES AND DIFFERENT GRID RESOLUTIONS

| Gaming Area (mi$^2$) | (X,Y) Grid Resolution (ft) | No. of Grid Points per mi$^2$ | No. of Grid Points in Area |
|---|---|---|---|
| 1 × 5 = 5 | 1 | 2.8 × 10$^7$ | 140 × 10$^6$ |
| 10 × 50 = 5 × 10$^2$ | 10 | 2.8 × 10$^5$ | 140 × 10$^6$ |
| 100 × 500 = 5 × 10$^4$ | 100 | 2.8 × 10$^3$ | 140 × 10$^6$ |

TABLE IV
BYTES PER VOXEL REQUIRED BY EACH DATA STRUCTURE CASE

| Data Structure Case | No. of Voxels at Grid Point | No. of Variable Z Values | No. Of Bytes Per | | | |
|---|---|---|---|---|---|---|
| | | | Color | Z-Value | Voxel | Grid Pt. |
| 1 | 1 | 0 | 1 | 0 | 1 | 1 |
| 2 | 1 | 1 | 1 | 2 | 3 | 3 |
| 3 | 3 | 3 | 1 | 2 | 3 | 9 |

An alternate method of building the data base is to use a nested hierarchy of resolutions. A 1×5 square mile area of interst is modeled at high resolution (1 ft) to support low flight. This high resolution area is embedded in a 10×50 square mile area at medium resolution (10 ft), and the 10×50 square mile area is embedded in a 100×500 square mile area at low resolution (100 ft). The low resolution data base supports high air-to-air training missions and the high resolution data base supports lower air-to-ground missions. The medium resolution data allows a smooth transition in altitude. The memory required for this 100×500 variable resolution data base is 3×420 or 1,260 megabytes (MB) if the data structure of Case 2 is used.

Dynamic objects are modeled as variations of Case 3 using multiple valued two-dimensional surfaces that are usually continuous. For example, the fuselage and wing of a plane are double valued in Z, as are general surfaces like ellipsoids and spheres.

The use of variable resolutions in the data base allows adaptive sampling along a ray, where sampling using coarse steps occurs through empty space, and sampling using fine steps occurs near opaque surfaces.

Advantage can be taken of bit parallel arithmetic using Case 4 of the algorithm. For example, if the volume element or voxel state is binary (transparent=0, opaque=1) and 3×3×3=27 voxel states are packed in one 32 bit word, then steps at units of 3 voxels are taken before stepping at units of one voxel. If the integer word is zero, then the 3×3×3 voxel is transparent and another 3-unit step is taken. If now the integer word is non-zero, then unit steps must be taken along the ray and the appropriate bits tested. As the word is already in a register, full advantage is taken of the highest speed memory.

IMAGE MAPPING

A unique strength of a ray tracing algorithm compared to a polygon algorithm is its ease in solving the image mapping problem. This problem involves mapping a planar source image surface, the coordinates of which are (u, v), onto a non-planar display surface through some lens system. Pixels on this source surface, which is like a single frame of movie film, radiate light through the lens system. The lens system then projects and focuses the source pixel onto a unique pixel of the non-planar surface (e.g., a spherical screen). If the (u, v) pixels of the source surface are indexed by (K, L), then they are mapped onto a unique set of screen pixel coordinates X(K, L), Y(K, L) and Z(K, L). This mapping is determined by the optics of the lens system.

To modify the algorithm to accommodate this mapping, each of the X, Y and Z screen pixels indexed by K and L are rotated into their corresponding ray vector R(I):

$$R(I) = RM(I,1)*X(K,L) + RM(I,2)*Y(K,L) + RM(I,3)*Z(K,L)$$

where RM is the rotation matrix. The values of X(K, L), Y(K, L) and Z(K, L) can be computed once in a preprocessing mode and stored in memory for table lookup. This non-planar screen version of the algorithm requires a rotation transformation on each screen sample point, whereas the flat screen version of the algorithm required rotation of only the three corners of the screen, followed by a linear combination of the U and V screen vectors.

OPTIMIZATION USING IMAGE AND DATA BASE RANGE COHERENCE

If data values have coherence, then they are correlated and probably close in value. Image coherence is the two-dimensional property of the image in which two pixels which are close in position are also close in value. Data base range coherence is the three-dimensional property that two rays which are close in position have ranges from the eye to their first opaque voxel that are close in value. Optimization for a real time system requires that the property being used for optimization appears in all images. Since image coherence mainly occurs in images of man-made objects at close range with large homogeneous image areas, and image coherence decreases as the range increases so that more objects are projected onto only a few pixels, image coherence is not suitable for optimization of a real time system; however, range coherence occurs in all images.

The coherence in range does depend upon the roll, pitch and yaw angles. These rotation angles that determine attitude are defined in the description relating to FIG. 6. If roll is zero, so that the top and bottom of the screen are parallel to the horizon, then range is an almost monotonically increasing function as the ray traverses the screen from the bottom to the top of a vertical scan line. The exception occurs when Z(X, Y) increases for objects on the terrain and the pitch is down. The more Z(X, Y) is a gradually changing convex surface, the more range tends to increase monotonically. With a downward pitch angle at the edge of vertical objects like buildings, the range increases and then decreases due to the perspective effect of the top of the building nearer the eye appearing wider than the bottom of the building. This problem is solved by adding a convex surface to fill in the concavities at the edge of vertical sides of objects, i.e., case 2 plus a concave fill surface. Also, by more accurately stepping along a ray, that is, stepping along integer voxel boundaries, jagged lines due to aliasing caused by inaccurately stepping along a ray by merely incrementing the range are decreased.

The use of range coherence along a vertical scan line results in a large decrease in processing and memory accesses compared with stepping along each ray starting from the eye. Instead of decomposing the image into vertical scan lines for range coherence, the image may be decomposed into a grid of square subimages. A square subimage may be decomposed into a sequence of concentric square annuli one pixel wide which converge on the pixel in the center of the subimage. If the subimage pixels are processed by first ray tracing the outermost annulus from the eye, and then sequentially processing each square annulus progressing from the outermost annulus of the subimage towards its center, then each inner annulus can use the minimum value of RNG_64 obtained from the rays in the adjacent exterior annulus, where RNG_64 is the range at which a ray intersected its first opaque coarse resolution (64 units) voxel. This approach is more general than the vertical scan line approach and works for any values of roll, pitch and yaw; however, it takes less advantage of range coherence.

With the vertical scan line approach, an oversized image is first computed using the correct values of EX, EY, EZ, pitch and yaw. This image is then rotated by the roll angle to produce the correct image. The only pixels in the oversized image that need to be computed are the subset actually used in the rotated image.

INFINITE EXTENSION OF THE DATA BASE USING MODULO ARITHMETIC

Modulo arithmetic is used to repeat the synthetic and aerial photography data bases indefinitely by converting larger virtual (X, Y) addresses to the physical range; e.g., (722, 515) becomes (210, 3) if the size of the data base is 512×512. This allows the algorithm to be used with a high density infinite data base which is useful, for example, in simulating a fighter plane flying at low altitude, say 200 feet, with a shallow downward look angle.

DATA BASE MODELING

The Data Base Modeling and Analysis System (DBMAS) shown in FIG. 3 consists of multiple data bases and the hardware and software needed to manipulate them. The Data Base Management System's (DBMS) software creates, modifies and transforms these data bases. The display algorithm requires a data base dependent on volume elements (voxels) as opposed to edges and polygons. This voxel display algorithm results in a simpler transformation from a gridded Defense Mapping Agency elevation data base to a simulation data base, since the simulation data base is also gridded. This voxel (gridded) data base is used to describe the natural terrain and man-made structures, and is created by digitizing the aerial photographs into a very fine grid. This grid is then overlaid onto the corresponding digital terrain elevation data. There are two reasons for using a voxel type data base: (1) hardware efficiency is improved if the memory can be organized (highly interleaved) such that the scanning process can access the memory with minimal contention; and (2) natural terrain texturing is improved if the data originates from aerial photography; the details of the terrain textures are built-in. At each location, (X, Y), the voxel data base contains the color (or brightness) information and the elevation value of that location.

In initializing this real time computer image generated (CIG) data structure from a non-real time simulation data base, voxel data in a hierarchy of resolutions is created and stored, e.g., 1, 10, and 100. The computer image generating system can then process the data at the resolution appropriate to the range between the viewer and the object being viewed. At 10 units resolution, the average of the 1 unit resolution data is stored, and at 100 units resolution, the average of the 10 unit resolution data is stored. This averaging of voxels to treat range dependent level of detail can be performed automatically, as contrasted with the human decisions on level of detail required by a polygon data base. If high resolution data is required only in a corridor through the data base, then the data base management system (DBMS) creates a non-real time simulation data base at coarse resolution outside the corridor, and high resolution inside the corridor to support this range dependent variable resolution processing.

The menu driven data base management software modules are presented below.

DATA BASE MANAGEMENT SOFTWARE MODULES

1. HELP—MODULES CONTAINING INFORMATION TO HELP THE NEW USER, INCLUDING GENERAL SYSTEM INFORMATION. THESE ARE STORED IN A HIERARCHICAL STRUCTURE.
2. DATA BASE QUERY
    2.1 DISK SPACE AVAILABLE
    2.2 FILE INFORMATION—AT DIFFERENT LEVELS OF DETAIL
    2.3 LIST OF STORED GEOMETRIC DATA BASES
        2.3.1 TERRAIN
        2.3.2 OBJECTS
    2.4 LIST OF STORED SIMULATION DATA BASES
    2.5 LIST OF STORED AUXILIARY DATA BASES
        2.5.1 DIGITAL DATA AND ONLINE OR OFFLINE LOCATION
        2.5.2 ANALOG DATA AND THEIR LOCATIONS (E.G. ROOM 23)
3. TRANSFORMATION OF DATA BASES
    3.1 GEOMETRIC TO GEOMETRIC
        3.1.1 INTERPOLATION
            3.1.1.1 LINEAR
            3.1.1.2 NONLINEAR—POLYNOMIAL, BICUBIC, QUADRIC, SPLINE, FOURIER SERIES.
            3.1.1.3 RANDOM—E.G. 3D FRACTALS
        3.1.2 EXTRACTION OF SUBSETS
        3.1.3 MERGING OF SUBSETS
        3.1.4 CHECK FOR CONTINUITY (INTEGRITY, CONSISTENCY, VALIDITY)
    3.2 ADDITION OF SENSOR DATA
        3.2.1 ADDITION OF COLOR (RED, GREEN, BLUE) FOR VISUAL
        3.2.2 ADDITION OF SURFACE NORMAL FOR VISUAL AND RADAR
        3.2.3 ADDITION OF RADAR REFLECTIVITY (ANGULAR DEPENDENCE)
        3.2.4 ADDITION OF IR EMISSIVITY
        3.2.5 ADDITION OF LLTV INTENSITY
    3.3 NON-REAL-TIME SIMULATION TO REAL-TIME SIMULATION
4. DIGITIZATION
    4.1 LINE DRAWINGS
        4.1.1 2D
        4.1.2 3D
    4.2 3D MODELS
    4.3 IMAGES
5. OBJECT CREATION 5.1 SURFACE OF REVOLUTION
5.2 MERGING FEATURES AND COMPONENTS
6. OBJECT MANIPULATION—TRANSLATE, ROTATE, SCALE, INPUT SHAPE PARAMETERS (BOUNDARY POINTS, SHADOW LENGTH, HEIGHT)
7. SOLAR MODEL—ILLUMINATION, SHADING, SHADOWS, TEMPERATURE
8. COLOR PALETTE—FOR SELECTION AND MATCHING OF COLOR
9. TEXTURE
   9.1 REGULAR—CHECKBOARD
   9.2 RANDOM—LARGE CHECKERBOARD, SMALL SPECKLES, WAVES
   9.3 2D FRACTALS
10. ATMOSPHERE AND WEATHER
   10.1 CLOUDS, FOG, HAZE, SMOG, DUST, SMOKE
   10.2 PRECIPITATION IN AIR
   10.3 PRECIPITATION ON SURFACES—RAIN, SNOW, ICE
11. AUXILIARY IMAGE (VISUAL, SAR, IR) DATA
   11.1 REGISTER TO TERRAIN DATA BASE
   11.2 2D TO 3D MAPPING ONTO TERRAIN DATA BASE
12. TRAJECTORY DETERMINATION—FOR PLANNG TRAINING TASKS AND SCENARIOS
   12.1 TARGET OR THREAT TRAJECTORIES VIEWED FROM FIXED POSITION AND ATTITUDE IN THE DATA BASE
   12.2 OWNSHIP TRAJECTORIES VIEWED FROM OWNSHIP MOVING THROUGH DATA BASE
   12.3 SAME AS 12.2 BUT ALSO VIEWING 12.1
   12.4 GOD'S EYE (ORTHOGRAPHIC) VIEW OF ANY OF THE ABOVE FROM SUFFICIENTLY DISTANT POSITION AND ATTITUDE SO THAT WHOLE GAMING AREA IS IN VIEW OR A DESIRED SECTION OF AREA

The software design goal was ease of creation of correlated visual and sensor data bases by non-technical personnel. The user of this subsystem does not need to know a programming language. After logging on to the system, the user interacts with the menu presented on a CRT and written in English. Each menu displayed would have HELP as the first selectable item. If HELP is selected, some level of information is displayed about that menu.

Most of the modules are self-explanatory, and some are dependent on each other. For example, in transforming a geometric data base to a visual simulation data base, the user might also be using the color palette module, module (8) above. To realistically add color to terrain or to an object on the terrain, the user would query the list of auxillary analog data module (2.5.2) for aerial photography.

This computer image generation approach allows solar model or time of day (module 7) information to be added to the data base in a preprocessing mode. This information includes direction of illumination, shading of surfaces, shadows of static objects, and temperature to drive IR intensity. Atmospheric and weather effects can be added to a given simulation data base using modules 10.1-3.

A major feature of the all digital approach to data base creation is maintaining correlated simulation data bases. If the application requires the creation of visual, IR, and LLLTV data bases, then they are all created from the same geometric data base. Adding or deleting an object occurs in the geometric data base and is then propagated through to the simulation data bases.

The hardware to implement the non-real time DMBAS has the same architecture as the real-time hardware of FIG. 4, but can use slower and/or fewer hardware components. The subimage processors are composed of off-the-shelf multiprocessors like the Alliant, and a network of these multiprocessors linked by Ethernet are used to tune the system size to the system through-put requirement. These multiprocessors also function as input units or output units, and also support the data base creation software discussed above as well as the simulation software.

SYNTHETIC DATA BASE MODELING

The synthetic data base provides the capability to model flat linear surfaces as well as curved non-linear surfaces, such as circular lakes and cylindrical storage tanks. In the case of a storage tank, smooth shading is employed and case 2 of the algorithm is used. Trees are modeled using cones with random variation in both Z and shade in the rings of voxels that make the cone.

AERIAL PHOTOGRAPHY DATA BASE MODELING

Interactive data base management software provides for the tracing on the digitized photograph of polygon boundaries of objects (like buildings). A constant Z value is then assigned to the polygon if the object has a flat horizontal roof. The Z value is estimated using the length of the object's shadow.

EFFECT OF MEMORY MANAGEMENT AND ORGANIZATION ON SYSTEM ARCHITECTURE

The system design objectives for memory management and organization are:
1. Structure visual and sensor simulation software to:
   a. minimize requests to global memory (GM);
   b. maximize locality of global memory references so that memory references from different processes are decoupled.
2. Satisfy processor-to-global memory bandwidth requirements of simulation software.
3. Minimize interconnection network hardware between processors and global memory in both number and width of data paths.

As discussed hereinabove, three-dimensional range coherence is used to minimize both processing and global memory (GM) requests during the stepping along a ray. The computation of the image is decomposed into parallel tasks to compute either vertical or square subimages, where the vertical subimage processing involves serial processing from the bottom to the top of the image in a vertical scan line. Since the data is referenced by its (X, Y, Z) location, the data accessed in the field of view of one subimage, in general, is different from data accessed in other subimage fields of view. The simulation software therefore satisfies the first set of design objectives.

Two memory management approaches have been considered to meet the last two objectives.

1. Static memory management initializes global memory with the full data base from disk prior to image computation, with no real time update.
2. Dynamic memory management initializes global memory with a subset of the data base in the field of view of the first frame and updates global memory from rotating disks during the current frame with the next frame's data base subset as it differs from the current frame's data base.

The difficult constraints that are faced in this analysis are the real time performance requirement and the performance parameters of semiconductor and rotating disk memory hardware. The advantage of the first approach is its independence from disk technology. The disadvantage is that the cost of semiconductor memory for the system is proportional to the size of the full data base (e.g., 200×200 sq n mi) as opposed to the size of the subset of the data base (e.g., 5×20 sq n mi) required to compute the current frame's image.

Two organizations of the global memory that can be used with either of the above memory management approaches are compared below. They are distinguished by whether the data processing function directly accesses global memory for packets of data as the software requires it, or whether the data processing function directly accesses packets only from a local memory decomposed into pages previously brought in from the global memory.

ORGANIZATIONS OF GLOBAL MEMORY (GM)

Packet Access

1. Packet size is determined by the individual software access of voxel state from data base and address space size (e.g., 5 bytes).
2. Packets are interleaved across global physical memory units (GPMU) to minimize access contention, but a single packet is stored in a single global physical memory unit (GPMU).
3. Packets are accessed from the global physical memory unit (GPMU) by processors in a single frame to produce an image.
4. Only the packets that a processor requires are accessed.
5. Does not require duplicate page memory in local memory (LM).
6. High frequency of processor access requests to the global physical memory unit (GPMU) for small packet transmission.
7. Limited by speed of memory chips.
8. Transmission of pages from disk to the global physical memory unit (GPMU) requires the interconnection network (ICN) to distribute interleaved packets in a page.
9. Processor design must solve problem of latency of the global physical memory unit (GPMU) accessed.
10. The interconnection network (ICN) supports processing and dynamic memory management using either overlapping or a time sliced approach.

Page Access

1. Page size is determined by the number of the (X, Y) grid elements in the data base equivalent to one page (e.g., 40,000 voxels).
2. Pages are interleaved across global physical memory units (GPMU) to minimize access contention, but a single page is stored in a single global physical memory unit (GPMU).
3. The sending of pages from the global physical memory unit (GPMU) to the processor for the next frame is overlapped with processors accessing packets from local memory (LM) for a current frame.
4. Pages in the local memory (LM) contain some unneeded data.
5. Requires duplicate page memory in the local memory (LM) to store pages for the current and the next frame.
6. Low frequency of the processor access requests to the global physical memory unit (GPMU) for large block (page) transmission.
7. Effective access speed can be higher than the speed of the memory chips due to interleaving of pages on a single global physical memory unit (GPMU).
8. Pages can be directly transmitted to the global physical memory unit (GPMU) without the use of the interconnection network (ICN) if the global physical memory unit (GPMU) has two ports.
9. Suitable for single or multiple virtual memory processors on a single bus.
10. The interconnection network (ICN) supports only memory management which is overlapped with processing.

The page management approach, as seen in FIG. 8, uses virtual memory subimage processors (SIP) as hardware building blocks. The subimage processors are directly connected to the global physical memories (GPM). The definition of software tasks on the subimage processors and the organization of pages on the global physical memories is presented in FIG. 9 with an implied connection to the global virtual memory units (GVMU). Three alternate organizations of the global virtual memory units are shown in FIG. 10 to support static and dynamic memory managment. A standard memory hierarchy uses a rotating magnetic or optical disk for global virtual memory, dynamic random access memory (DRAM) for global physical memory (GPM), and static random access memory (SRAM) plus registers for local memory (LM), where these memories are listed in order of increasing cost and performance.

In the light of the foregoing, a further explanation of the invention as described in connection with FIG. 4 is made, referring to FIGS. 8, 9, and 10.

FIG. 8 illustrates an implementation of two memory management approaches.

FIG. 9 illustrates an organization of a global physical memory. In connection with FIG. 9, the following are defined:

| | |
|---|---|
| Task | = a number of adjacent vertical scan lines (NV) that get processed serially on a subimage processor in a single frame. |
| NT | = the number of tasks executed in parallel on a subimage processor. |
| NV*NT | = the number of verticl scan lines that get processed on a subimage processor. |
| N_PIX | = the total number of vertical scan lines. |
| | = the number of pixels per horizontal scan line. |
| | = NV.NT.NI |
| NI | = N_PIX/(NV*NT) = the number of subimage processors. |
| NT | = the number of global physical memories GPM (I, J) for J = 1, 2, ... NT that comprise the global physical memory GPM(I). |
| | = the number of dual busses required to avoid read/write conflicts during memory management. |
| N8 | = the number of pages P(I, J, K) per global physical memory GPM(I, J), |

| | where N8 is determined by memory management solution. |
|---|---|
| | = (No. of active pages being read by subimage processing for processing) + (No. of active pages being written by the virtual memory processors). |
| VMP | = the virtual memory processors that determines the sequence of pages required by a subimage processor task, and sends the subimage processors those pages in the required sequence at a time preceeding their need by the subimage processor. |

FIG. 10(a) illustrates static memory management. All pages of the data base are interleaved over semiconductor RAM "disks" global virtual memory units GVMU(I) which are controlled by virtual memory processors VMP. This initialization of the global virtual memory unit GVMU(I) occurs before real time processing begins.

FIGS. 10b and 10c illustrate dynamic memory management using rotating magnetic or optical discs (D) with ND disks on a bus to mask disk access time by the virtual memory processors (VMP). The virtual memory processors access single pages of the global virtual memory (GVM) which they store in their buffer random access memory. These pages are ready for high speed transfer by the virtual memory processor to the next stage in the hierarchy. Specifically, FIG. 10b illustrates one level of a virtual memory processor for buffering single pages from disk memory D(I, J) and FIG. 10b illustrates two levels of virtual memory processors with the global virtual memory GVM(I) buffering groups of pages required in the next NF frames.

In FIG. 8, a real time visual and sensor simulation system is shown which illustrates static and dynamic memory management. Here, current trajectory data, (X, Y, Z)=current position and (R, P, Y)=current attitude (Roll, Pitch, Yaw) and their velocity and acceleration components, is supplied to a memory management computer MMC, having access to a rotating magnetic or optical disk (D). The subimage processors (SIP), object processors (OP) and global virtual memory units (GVMU) are under the control of the memory management computer MMC. The system is composed of N1 subimage processors where N1 is the number of subimage processors required to compute subimages in real time. Each subimage processor has its own global physical memory (GPM) which is connected by an N5×N6 interconnection network ICN(1) to the subimage processors' global virtual memory units (GVMU) (and there are N6 global virtual memory units, either disk or RAM, plus a controller). N5 is assumed to be greater than or equal to N6, and N5=N1 * NT is the total number of tasks executed in parallel by the subimage processors (SIP).

As noted in connection with FIG. 9, a task is defined as a number (NV) of adjacent vertical scan lines that get processed serially on a subimage processor (SIP) in a single frame and (NT) is the number of tasks executed in parallel on a subimage processor(SIP). The bandwidth to support dynamic update of these pages determines the number of input ports or N6. There are N2 object processors (OP), each with its nonshared object memory (OM). The number of image processors (IP) is N3 and they are connected to N3 image memories (IM) and N4 frame buffer memories (FB) which drive the display. An optional set of N7 global virtual memory units (GVMU) are connected to the image memories (IM) by the interconnection network ICN(3), if the voxel color data is stored here on the image processor's subsystem as opposed to being stored on the subimage processor subsystem where N3×N7 is assumed. The number of disks (D) required to mask page seek and buffer time by the virtual memory processors (VMP) of FIG. 10 is ND.

The processing and data transfer requirements of each processor are examined in succession below. The memory management computer (MMC) does the following:

1. Initializes global physical memory (GPM) with pages needed to compute the image for frame I, and initializes addresses of pages which can be overwritten.
2. Inputs current position, attitude and trajectory data.
3. Sends current position and attitude to the virtual memory processors (VMP) for frame I.
4. Computes which pages are needed for frame I+1 that are not in global physical memory (GPM); which pages in global physical memory (GPM) from frame I−1 are not needed for frame I; and sends page update list of source page names and global physical memory (GPM(I)) destination page addresses to the virtual memory processors (VMP).

The virtual memory processors (VMP) determine the sequence of the pages required by a subimage processor task, and send to the subimage processor those pages in the required sequence at a time preceeding their need by the subimage processors. Each perform the required page transfers as follows:

1. Searches the memory management computer (MMC) page update list for matches with pages on its global virtual memory (GVM) or disk (D).
2. In static memory management, the virtual memory processor (VMP) then transfers pages that match the update list on the global virtual memory (GVM(I)) to the global physical memory (GPM(J)).
3. In dynamic memory management, the virtual memory processor (VMP):
   (a) seeks matched pages on the disk (D).
   (b) transfers pages of (a) to a random access memory buffer in the virtual memory processor (VMP).
   (c) sends page to the global physical memory (GPM(J)) when the shared virtual memory processor bus is ready.

The number of disks on the virtual memory processor bus (or N8) is selected to be large enough to mask the seek and buffer steps of 3a and 3b above.

The subimage processor (SIP(I)) computes a subimage using the voxel state data base. Locality of reference is used in this design so that no hardware is used to connect the subimage processor (SIP(I)) with the global physical memory (GPM(K)) unless I=K. Another savings of this application dependent design is that only unidirectional interconnection networks (ICN) are required since the data base is only read by the subimage processors (SIP).

The object processors (OP) compute the images and range values of the dynamic objects. In addition, a list of point and line objects (e.g., landing lights or telephone wires) are processed here.

The subimage processors (SIP) and the object processors (OP) send to the image processor address arrays indexed by the screen's line and pixel values, and the image processor (IP) uses these addresses, determined from ray traces into the voxel state data base, to fetch color values from the voxel color data base stored on the image memories (IM(I)). Prior to fetching color, the range values are used to resolve hidden surfaces between the subimage processor (SIP(I)) and the object processor (OP(J)). The image processor (IP) then rotates the image by the roll angle and resamples the image for post filtering. In addition, any range dependent effects, like haze, are added by the image processors (IP).

The size of the global physical memory (GPM(I) is given by:

Size GPM(I)=(Maximum No. of pages for frame I)+(Maximum No. of new pages needed for I+1).

These sizes are related to the flight rates and data base resolution. There are a few types of redundant memory in this design, but they are all used to either increase performance or decrease interconnection network costs. The pages which are intersected by the projection of the subimage borders must be stored on two global physical memories (GPM). These must be transferred twice when the virtual memory processor (VMP) retrieves them once from the disk memory. Both visible and hidden voxel data is fetched to the global physical memory (GPM) from the global virtual memory unit (GVMU) across the interconnection network (ICN(1)) but only visible data is accessed. These last two features increase the bandwidth requirement of the interconnection networks (ICN(1)). Without dynamic update, all pages are stored on the global virtual memory (GVM) plus the active subset on the global physical memory (GPM). With dynamic update, only single page random access memory buffers are needed in the virtual memory processors (VMP) that manage the disks.

The number of new pages needed for frame I+1 is related to maximum flight speed in the horizontal direction over the (X, Y) plane and the maximum yaw rate. The yaw rate problem is solved by having the memory management computer (MMC) rotate task assignments to the subimage processors (SIP) as the yaw angle changes. This rotation of task assignments allows many active pages in the global physical memory (GPM(I)) to still be used and only the last subimage processor requires a completely new set of pages.

If the algorithm and software processes vertical scan lines of the image in a serial fashion from the bottom of the image to the top, then this sequence of page accesses is built into the memory management design. The memory management computer (MMC) first tells the virtual memory processors (VMP) to access and send to global physical memory the pages at the bottom of the image and then successive pages from bottom to top. This is no advantage if the pages supplied by the virtual memory processor (VMP) during frame I are not used until frame I+1. However, when the virtual memory processors supply the pages during frame I to the global physical memories in this bottom-to-top sequence required in frame I, a large savings in the memory requirements of this system results. Now the size of global physical memory is just a few pages (e.g., 3) and it becomes a high speed page cache. One way to implement this is to have the virtual memory processor (VMP) use a simple two-dimensional scan conversion algorithm from the computer graphics field, e.g., and step along the ray's projection onto the (X, Y) plane from the eye to some maximum range at the resolution of the (X, Y) page grid. The virtual memory processor (VMP) then sends these pages to the global physical memory (GPM(I)) in this sequence. When the virtual memory processors (VMP) perform this page determination task, they assume, in a distributed sense, the bulk of the memory management computer functions and those functions are reduced to broadcasting the current position and attitude.

Another option is to compare the cost of multiple copies of the data base on separate disks accessed by either a single subimage or a small cluster of subimage processors. At one extreme, there is a single copy of the data base on disks, as shown in FIG. 8, but the added cost of the interconnection network is required to cross-couple all subimage processors with the disks. At the other extreme, there is the cost of multiple copies of the data base on separate disks at each subimage processor, but no requirement for an interconnection network or its cost.

What is claimed is:

1. A parallel processing computer image generation system for generating encoded image signals representing a scene as viewed by the human eye or sensors on a moving vehicle, comprising:

a plurality of subimage data processing devices for independently computing different images of terrain, static objects on the terrain and the sky;

object data processing devices for computing images of dynamic objects, points, lines, targets and special effects such as dynamic sea and dynamic atmospheric effects;

an image data processing device that generates the encoded image signals representing said scene;

means coupling said subimage data processing devices and said object data processing devices in parallel to supply image signal data to said image data processing device for simultaneous processing thereby to generate said encoded image signals representing said scene;

data sources coupled to said subimage data processing devices and to said object data processing devices to supply image data for processing; and means for controlling coupled to said subimage data processing devices, to said object data processing devices and to said data sources for said subimage and object data processing devices for:

(a) decomposing the scene into a plurality of different subimages, corresponding to the plurality of subimage data processing devices, each subimage comprising a rectangular array of adjacent pixels;

(b) controlling said subimage data processing devices and object data processing devices with respect to current image data; and (c) controlling said data sources for said subimage data processing devices with respect to image data which will be next needed for image generation.

2. The system according to claim 1 in which said data sources comprise:

object memories for said object data processing devices;

global physical memories coupled to said subimage data processing devices, containing subsets of data base needed for current image data processing;

global virtual memories containing at least a large terrain data base; and interconnection networks coupling said global virtual memories to said global physical memories to supply data thereto.

3. The system of claim 1 in which said means for controlling comprises:

a motion computation system for producing current and predicted indications of vehicle positions and attitudes; and means for coupling said motion computation system to said subimage data processing devices and said object data processing devices for providing control with respect to current image data and for coupling said motion computation system to provide control with respect to data which will be next needed for image processing and display.

4. A parallel processing computer image generation system for generating encoded image signals representing a scene as viewed by the human eye or sensors on a moving vehicle, comprising:

a plurality of subimage data processing devices for independently computing different images of terrain, static objects on the terrain and the sky;

object data processing devices for computing images of dynamic objects, points, lines, targets and special effects such as dynamic sea and dynamic atmospheric effects;

an image data processing device that generates the encoded image signals representing said scene;

means coupling said subimage data processing devices and said object data processing devices in parallel to supply image signal data to said image data processing device for simultaneous processing thereby to generate said encoded image signals representing said scene;

object memories coupled to said object data processing devices to supply image signal data thereto;

global physical memories coupled to said subimage data processing devices to supply current image signal data thereto;

global virtual memories containing at least a large terrain data base;

interconnection networks coupling said global virtual memories to said global physical memories; and means for controlling coupled to said subimage data processing devices, to said object data processing devices and to said global virtual memories for:
(a) decomposing the scene into a plurality of different subimages, corresponding to the plurality of subimage data processing devices, each subimage comprising a rectangular array of adjacent pixels;
(b) controlling said subimage data processing devices and object data processing devices with respect to current image data; and
(c) controlling said global virtual memories with respect to image data which will be next needed for image generation.

5. The system according to claim 4 in which said means for controlling comprises:

a motion computation system for producing current and predicted indications of vehicle positions and attitudes; and means for coupling said motion computation system to said subimage data processing devices and to said object data processing devices for providing control with respect to current image data and for coupling said motion computation system to said global virtual memories for providing control with respect to data which will be next needed for image generation.

6. A computer image generation system for generating encoded image signals representing a selected scene, comprising:

storage means providing a three-dimensional surface data base of discrete volume elements individually representative of different subimages of said scene;

means for accessing said data base for retrieving the data of all of the subimages comprising said selected scene;

a plurality of processors, each for processing data using a three dimensional visible surface technique with ray tracing for a corresponding subimage of said selected scene independently and in parallel with other subimages of said selected scene; and image generation means coupled to said means for processing the data for simultaneously processing the data for all of said subimages to generate encoded image signals representing said selected scene.

7. A computer image generation system for generating encoded image signals representing a selected scene, comprising:

storage means for providing a three-dimensional surface data base of discrete volume elements individually representative of a different subimage of said scene, a separate software task being created for each subimage, the code or logic in each task being identical but the input parameters for each subimage vary whereby the data processed from said data base varies with each task;

means for each software task for accessing said data base in accordance with said input parameters for each subimage for retrieving the data of all of the subimages comprising said selected scene;

a plurality of processors, each processor for processing data using a three-dimensional visible surface technique with ray tracing for a corresponding subimage of said selected scene independently and in parallel with other subimages of said selected scene; and image generation means coupled to said means for simultaneously processing the data for all of said subimages for generating encoded image signals representing said selected scene.

8. The system according to claim 7 in which said three dimensional data base comprises data base structures of volume elements of differing resolutions providing a hierarchical resolution data structure.

9. The system according to claim 8 in which a data base of high resolution is embedded in a data base of lesser resolution.

10. A three dimensional visible surface computer image generation system for generating encoded signals representing a selected scene, comprising:

storage means comprising a three-dimensional surface data base of discrete volume elements individually representative of different subimages of said scene, each volume having a location of said data base corresponding to the X, Y address in the plane of that portion of the scene represented by the volume element and being accessed by first and second step position vector components into said data base respectively representative of the X and Y values of said address, and a third step position vector components which is compared with elevation data stored in said data base in association with that address, stopping terminating when said third step position vector component is less than or equal to said elevation data;

means for accessing volume elements of said data base for retrieving the data of the subimages comprising said selected scene;

means for processing the data using a three-dimensional visible surface technique with ray tracing for each subimage of said selected scene independently and in parallel with other images of said selected scene; and image generation means coupled to said means for simultaneously processing the data for all of said subimages for generating encoded image signals representing said selected scene.

11. The system according to claim 10 in which said data base comprises a hierarchy of resolutions.

12. The system according to claim 10 in which said data base comprises a hierarchy of resolutions and maximum values of elevation data are stored at lesser elevation resolution values than the X, Y address values in each hierarchy of resolutions and stepping continues at low resolution values when said third step position vector component is above the low resolution value of said elevation data.

13. The system according to claim 12 in which stepping at the next higher resolution takes place only when said third step position vector component is less than or equal to the low resolution value of said elevation data.

14. The system according to claim 10 in which said selected image is decomposed into vertical scan lines and said data base is accessed for all elevation data associated with each volume element.

15. The system according to claim 10 in which said image is decomposed into a grid of square subimages each of which is decomposed into a sequence of concentric square annuli and said data base is accessed beginning with that portion representing the outermost square annulus and sequentially progressing in said data base to that portion representing the innermost square annulus.

16. In a computer image generation system, the method for generating encoded image signals representing a three dimensional image of a selected scene, comprising:

developing a data base of groups of signal states, each group of signal states forming a data base volume element the signal states of which represent a surface three-dimensional subimage of said scene, each volume element having a location of said data base identified with the grid point location of the subimage of the scene represented by that volume element;

accessing said volume elements in said data base in steps corresponding to simultaneous steps along individual rays from a viewing point projected into said scene;

processing the data using a plurality of processors, each processor using a three-dimensional visible surface technique with ray tracing from each accessed volume element for a corresponding subimage of said selected scene independently and in parallel with the data for other subimages of said selected scene; and thereafter simultaneously processing the data for all of said subimages for generating said encoded image signals.

17. In a computer image generating system the method of storing and accessing information in a computer data base, comprising:

providing a data base having a hierarchy of data resolutions, high, medium and low data resolutions;

storing the average of high data resolution at data base locations of medium data resolution;

storing the average of medium data resolution at data base locations of low data resolution; and accessing said data base locations beginning with locations of low data resolutions and accessing locations of higher resolution if the viewing range is less than certain precomputed threshold ranges.

18. In a computer image generating system the method for generating encoded image signals in real-time and non real-time representing a selected scene, comprising:

providing data bases of discrete volume elements individually representative of a different subimage of said scene;

providing a separate task for each subimage in which the logic for each task is identical;

employing different input parameters for each task for accessing data from said data bases which varies with each task;

executing said tasks and processing the data in a highly parallel mode to provide a high throughput of data for a real-time image; and executing said tasks and processing the data in a less parallel mode to provide a lesser data throughput for non-real time images.

* * * * *